United States Patent
Tomasi et al.

(10) Patent No.: US 9,224,137 B1
(45) Date of Patent: Dec. 29, 2015

(54) SYSTEM FOR AN AUTOMATED DISPENSING AND RETRIEVAL KIOSK FOR RECORDED MEDIA

(75) Inventors: Philip Tomasi, Newbury Park, CA (US); Alva D. Cravens, Los Gatos, CA (US); Jens Horstmann, Santa Clara, CA (US); William Barber, Newbury Park, CA (US); John Chen, Cupertino, CA (US)

(73) Assignee: Redbox Automated Retail, LLC, Bellevue, WA (US)

( * ) Notice: Subject to any disclaimer, the term of this patent is extended or adjusted under 35 U.S.C. 154(b) by 376 days.

(21) Appl. No.: 11/366,966

(22) Filed: Mar. 1, 2006

Related U.S. Application Data

(60) Provisional application No. 60/657,844, filed on Mar. 1, 2005.

(51) Int. Cl.
  G06K 7/08 (2006.01)
  G06K 15/00 (2006.01)
  G06Q 20/18 (2012.01)
  G03G 15/00 (2006.01)

(52) U.S. Cl.
  CPC ............. G06Q 20/18 (2013.01); G03G 15/55 (2013.01)

(58) Field of Classification Search
  USPC ........................................ 235/381, 383, 379
  See application file for complete search history.

(56) References Cited

U.S. PATENT DOCUMENTS

| | | |
|---|---|---|
| 4,598,810 A | 7/1986 | Shore et al. |
| 4,608,679 A | 8/1986 | Rudy et al. |
| 4,789,045 A | 12/1988 | Pugh |
| 4,812,629 A | 3/1989 | O'Neil et al. |
| 4,814,592 A | 3/1989 | Bradt et al. |
| 4,839,505 A | 6/1989 | Bradt et al. |
| 4,839,875 A | 6/1989 | Kuriyama et al. |
| 4,858,743 A | 8/1989 | Paraskevakos et al. |
| 4,866,661 A | 9/1989 | de Prins |
| 4,872,154 A | 10/1989 | Sakagami et al. |
| 4,893,705 A | 1/1990 | Brown |

(Continued)

FOREIGN PATENT DOCUMENTS

| | | |
|---|---|---|
| JO | 07182659 | 7/1995 |
| JP | 11-53638 | 2/1999 |

OTHER PUBLICATIONS

Phillips, Blockbuster form DVD video rental alliance in the U.S., AFX Europe, Sep. 9, 1998, 1 page.

(Continued)

Primary Examiner — Tuyen K Vo
(74) Attorney, Agent, or Firm — Perkins Coie LLP

(57) ABSTRACT

A system for an automated dispensing and retrieval kiosk for recorded media includes a kiosk having a plurality of vertical racks arranged in a circular formation, each vertical rack configured for storing a plurality of recorded media. A customer interface allows a customer to select or return a recorded media. A robotic element delivers the selected recorded media from the vertical racks to a media output, at the customer interface. The element also delivers a returned recorded media from a media input at the customer interface to the vertical racks. A computer controls operation of the kiosk, and an internet interface connects the kiosk to the Internet. The kiosk may communicate with a central server and/or other kiosks of a group, to locate a requested recorded media within a kiosk of the group. Once located within the group, the requested media may be reserved for customer pick-up.

18 Claims, 13 Drawing Sheets

(56) References Cited

U.S. PATENT DOCUMENTS

| | | | |
|---|---|---|---|
| 4,896,024 A | 1/1990 | Morello et al. | |
| 4,903,815 A | 2/1990 | Hirschfeld et al. | |
| 4,915,205 A | 4/1990 | Reid et al. | |
| 4,967,403 A | 10/1990 | Ogawa et al. | |
| 4,995,498 A | 2/1991 | Menke | |
| 5,013,897 A | 5/1991 | Harman et al. | |
| 5,028,766 A | 7/1991 | Shah | |
| 5,088,586 A | 2/1992 | Isobe et al. | |
| 5,095,195 A | 3/1992 | Harman et al. | |
| 5,107,667 A | 4/1992 | Tone et al. | |
| 5,133,441 A | 7/1992 | Brown | |
| 5,159,560 A | 10/1992 | Newell et al. | |
| 5,273,183 A | 12/1993 | Tuttobene | |
| 5,319,705 A | 6/1994 | Halter et al. | |
| 5,418,713 A | 5/1995 | Allen | |
| 5,445,295 A | 8/1995 | Brown | |
| 5,459,306 A | 10/1995 | Stein et al. | |
| 5,576,951 A | 11/1996 | Lockwood | |
| 5,633,839 A | 5/1997 | Alexander et al. | |
| 5,644,727 A | 7/1997 | Atkins | |
| 5,647,505 A | 7/1997 | Scott | |
| 5,699,262 A | 12/1997 | Lang et al. | |
| 5,715,403 A | 2/1998 | Stefik | |
| 5,724,521 A | 3/1998 | Dedrick | |
| 5,739,512 A | 4/1998 | Tognazzini | |
| 5,748,485 A | 5/1998 | Christiansen et al. | |
| 5,761,071 A | 6/1998 | Bernstein et al. | |
| 5,769,269 A | 6/1998 | Peters | |
| 5,822,216 A | 10/1998 | Satchell, Jr. et al. | |
| 5,822,291 A | 10/1998 | Brindze et al. | |
| 5,844,808 A * | 12/1998 | Konsmo et al. | 700/244 |
| 5,848,593 A | 12/1998 | McGrady et al. | |
| 5,850,442 A | 12/1998 | Muftic | |
| 5,860,362 A | 1/1999 | Smith | |
| 5,875,110 A | 2/1999 | Jacobs | |
| 5,900,608 A | 5/1999 | Iida | |
| 5,934,439 A | 8/1999 | Kanoh et al. | |
| 5,938,510 A | 8/1999 | Takahashi et al. | |
| 5,943,423 A | 8/1999 | Muftic | |
| 5,950,173 A | 9/1999 | Perkowski | |
| 5,971,273 A | 10/1999 | Vallaire | |
| 6,032,130 A | 2/2000 | Alloul et al. | |
| 6,072,766 A | 6/2000 | Konshak | |
| 6,109,524 A | 8/2000 | Kanoh et al. | |
| 6,119,932 A | 9/2000 | Maloney et al. | |
| 6,169,483 B1 | 1/2001 | Ghaffari et al. | |
| 6,182,857 B1 | 2/2001 | Hamm et al. | |
| 6,201,474 B1 | 3/2001 | Brady | |
| 6,209,787 B1 | 4/2001 | Iida | |
| 6,264,104 B1 | 7/2001 | Jenkins et al. | |
| 6,286,139 B1 | 9/2001 | Decinque | |
| 6,289,322 B1 | 9/2001 | Kitchen et al. | |
| 6,321,984 B1 | 11/2001 | McCall | |
| 6,327,230 B1 | 12/2001 | Miller et al. | |
| 6,330,491 B1 | 12/2001 | Lion | |
| 6,336,098 B1 | 1/2002 | Fortenberry et al. | |
| 6,366,914 B1 | 4/2002 | Stern | |
| 6,424,706 B1 | 7/2002 | Katz et al. | |
| 6,434,326 B1 | 8/2002 | Kondo et al. | |
| 6,493,110 B1 | 12/2002 | Roberts | |
| 6,513,015 B2 | 1/2003 | Ogasawara | |
| 6,539,417 B2 | 3/2003 | Stern | |
| 6,554,184 B1 | 4/2003 | Amos | |
| 6,584,450 B1 | 6/2003 | Hastings et al. | |
| 6,688,523 B1 | 2/2004 | Koenck | |
| 6,748,539 B1 | 6/2004 | Lotspiech | |
| 6,758,370 B2 | 7/2004 | Cooke | |
| 6,954,732 B1 | 10/2005 | DeLapa et al. | |
| 6,965,869 B1 | 11/2005 | Tomita et al. | |
| 7,058,581 B1 | 6/2006 | Young | |
| 7,234,609 B2 * | 6/2007 | DeLazzer et al. | 221/10 |
| 2001/0011252 A1 | 8/2001 | Kasahara | |
| 2001/0037207 A1 | 11/2001 | Dejaeger | |
| 2002/0046122 A1* | 4/2002 | Barber et al. | 705/17 |
| 2002/0087859 A1* | 7/2002 | Weeks et al. | 713/156 |
| 2002/0095680 A1 | 7/2002 | Davidson | |
| 2003/0061271 A1* | 3/2003 | Pittarelli | 709/203 |
| 2003/0074106 A1* | 4/2003 | Butler | 700/236 |
| 2004/0064371 A1 | 4/2004 | Crapo | |
| 2004/0112070 A1* | 6/2004 | Schanin | 62/132 |
| 2004/0164146 A1* | 8/2004 | Rosenblum | 235/381 |
| 2005/0086127 A1 | 4/2005 | Hastings et al. | |
| 2005/0267819 A1 | 12/2005 | Kaplan | |
| 2009/0005905 A1* | 1/2009 | Kuehnrich et al. | 700/241 |

OTHER PUBLICATIONS

Ingram Relaunches DVD Rental Kiosk Program, Updates Software Package, Video Store, vol. 20, No. 5, p. 8, Feb. 1, 1998.

Beauprez, Jennifer; Maker of Automated DVD-Sales Kiosks Targets College Students; Denver Post; Dec. 6, 1999.

131 Affidavit & Exhibits in U.S. Appl. No. 09/578,631, filed Aug. 27, 2007, 163 pages.

131 Affidavit & Exhibits in U.S. Appl. No. 09/578,631, filed Apr. 16, 2004, 68 pages.

Office Action dated Nov. 19, 2007, U.S. Appl. No. 09/578,631, 30 pages.

Appeal Brief filed Apr. 18, 2008, U.S. Appl. No. 09/578,631, 216 pages.

Supplemental Appeal Brief filed May 22, 2008, U.S. Appl. No. 09/578,631, 5 pages.

Notice of Allowance issued Aug. 8, 2008, U.S. Appl. No. 09/578,631, 14 pages.

Comments on Statement of Reasons for Allowance filed Aug. 14, 2008, U.S. Appl. No. 09/578,631, 2 pages.

Office Action dated May 8, 2002, U.S. Appl. No. 09/578,631, 12 pages.

Response to Office Action dated May 8, 2002, U.S. Appl. No. 09/578,631, filed Nov. 6, 2002, 8 pages.

Office Action dated Dec. 19, 2002, U.S. Appl. No. 09/578,631, 16 pages.

Response to Office Action dated Dec. 19, 2002, U.S. Appl. No. 09/578,631, filed Jun. 19, 2003, 32 pages.

Office Action dated Aug. 6, 2003, U.S. Appl. No. 09/578,631, 10 pages.

Response to Office Action dated Aug. 6, 2003, U.S. Appl. No. 09/578,631, filed Nov. 6, 2003, 12 pages.

Office Action dated Jan. 2, 2004, U.S. Appl. No. 09/578,631, 12 pages.

Response to Office Action dated Jan. 2, 2004, U.S. Appl. No. 09/578,631, filed Apr. 16, 2004, 9 pages.

Office Action dated Jul. 22, 2004, U.S. Appl. No. 09/578,631, 10 pages.

Response to Office Action dated Jul. 22, 2004, U.S. Appl. No. 09/578,631, filed Jan. 4, 2005, 72 pages.

Office Action dated Mar. 30, 2005, U.S. Appl. No. 09/578,631, 9 pages.

Appeal Brief U.S. Appl. No. 09/578,631, filed Sep. 26, 2005, 45 pages.

Office Action dated Mar. 9, 2006, U.S. Appl. No. 09/578,631, 18 pages.

Response to Office Action dated Mar. 9, 2006, U.S. Appl. No. 09/578,631, filed Aug. 9, 2006, 38 pages.

Office Action dated Feb. 26, 2007, U.S. Appl. No. 09/578,631, 27 pages.

Response to Office Action dated Feb. 26, 2007, U.S. Appl. No. 09/578,631, filed Aug. 27, 2007, 26 pages.

Office Action dated Apr. 1, 2009, U.S. Appl. No. 09/903,444, 59 pages.

Appeal Brief, U.S. Appl. No. 09/903,444, filed Dec. 18, 2008, 50 pages.

Office Action dated Sep. 18, 2008, U.S. Appl. No. 09/903,444, 31 pages.

Appeal Brief, U.S. Appl. No. 09/903,444, filed Jun. 9, 2008, 271 pages.

Notice of Appeal, U.S. Appl. No. 09/903,444, filed Apr. 8, 2008, 1 page.

Office Action dated Jan. 8, 2008, U.S. Appl. No. 09/903,444, 36 pages.

(56) References Cited

OTHER PUBLICATIONS

Response to Office Action dated May 3, 2007, U.S. Appl. No. 09/903,444, filed Oct. 31, 2007, 25 pages.
Declaration of Jens Horstmann Under 37 CFR 1.132 with Exhibits, filed in U.S. Appl. No. 09/903,444, Oct. 31, 2007, 198 pages.
Office Action dated May 3, 2007, U.S. Appl. No. 09/903,444, 38 pages.
Response to Office Action dated Feb. 9, 2007, U.S. Appl. No. 09/903,444, filed Mar. 16, 2007, 20 pages.
Office Action dated Feb. 9, 2007, U.S. Appl. No. 09/903,444, 36 pages.
Response to Office Action dated Sep. 27, 2006, U.S. Appl. No. 09/903,444, filed Nov. 10, 2006, 27 pages.
Office Action dated Sep. 27, 2006, U.S. Appl. No. 09/903,444, 28 pages.
Request for Continued Examination, U.S. Appl. No. 09/903,444, filed Jul. 20, 2006, 2 pages.
Advisory Action dated Jul. 17, 2006, U.S. Appl. No. 09/903,444, 4 pages.
Response to Office Action dated May 2, 2006, U.S. Appl. No. 09/903,444, filed Jun. 30, 2006, 27 pages.
Office Action dated May 2, 2006, U.S. Appl. No. 09/903,444, 12 pages.
Amendment and Response with Statement of Substance of Telephone Interview, U.S. Appl. No. 09/903,444, filed Feb. 15, 2006, 22 pages.
Response to Office Action dated Dec. 29, 2005, U.S. Appl. No. 09/903,444, filed Feb. 7, 2006, 14 pages.
Office Action dated Dec. 29, 2005, U.S. Appl. No. 09/903,444, 12 pages.
Response to Restriction Requirement dated Sep. 23, 2005, U.S. Appl. No. 09/903,444, filed Oct. 4, 2005, 9 pages.
Restriction Requirement dated Sep. 23, 2005, U.S. Appl. No. 09/903,444, 6 pages.
Response to Office Action dated Apr. 26, 2005, U.S. Appl. No. 09/903,444, filed Jun. 24, 2005, 28 pages.
Office Action dated Apr. 26, 2005, U.S. Appl. No. 09/903,444, 7 pages.
Response to Office Action dated Oct. 6, 2004, U.S. Appl. No. 09/903,444, filed Jan 21, 2005, 14 pages.
Office Action dated Oct. 6, 2004, U.S. Appl. No. 09/903,444, 7 pages.
PCT/US2000/014398, International Search Report mailed Sep. 6, 2000, 2 pages.
Office Action dated Oct. 1, 2008, U.S. Appl. No. 11/584,981, 12 pages.
Office Action dated Sep. 30, 2008, U.S. Appl. No. 11/584,865, 13 pages.
Response to Office Action, U.S. Appl. No. 11/584,865, filed Feb. 2, 2009, 14 pages.
Response to Office Action, U.S. Appl. No. 11/584,981, filed Feb. 2, 2009, 11 pages.
Office Action dated May 27, 2009, U.S. Appl. No. 11/584,981, 13 pages.
Office Action dated May 26, 2009, U.S. Appl. No. 11/584,865, 17 pages.
Civil Action No. 1:08 cv 803, *DVDPlay, Inc.* v. *Redbox Automated Retail LLC*, Complaint (and Exh. A) filed Oct. 28, 2008, 52 pages.
Civil Action No. 1:08 cv 802, *DVDPlay, Inc.* v. *Coinstar E-Payment Services Inc. et al.*, Complaint (and Exh. A) filed Oct. 28, 2008, 53 pages.
Civil Action No. 1:08 cv 6183, *Redbox Automated Retail* v. *DVDPlay, Inc.*, Complaint filed Oct. 28, 2008, 4 pages.

\* cited by examiner

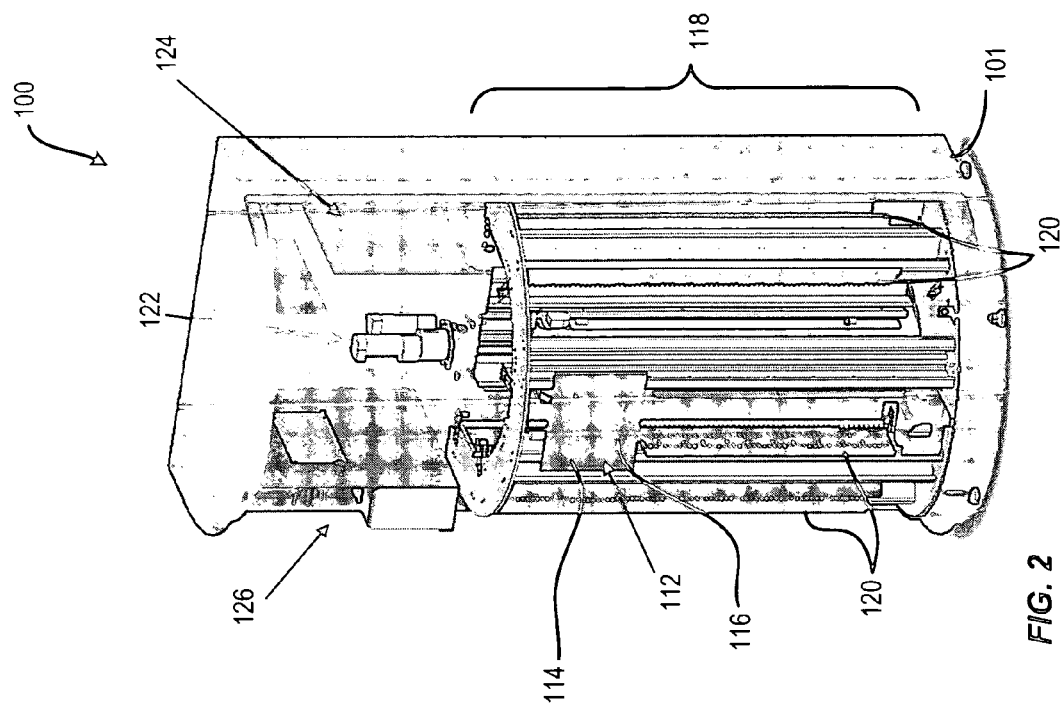
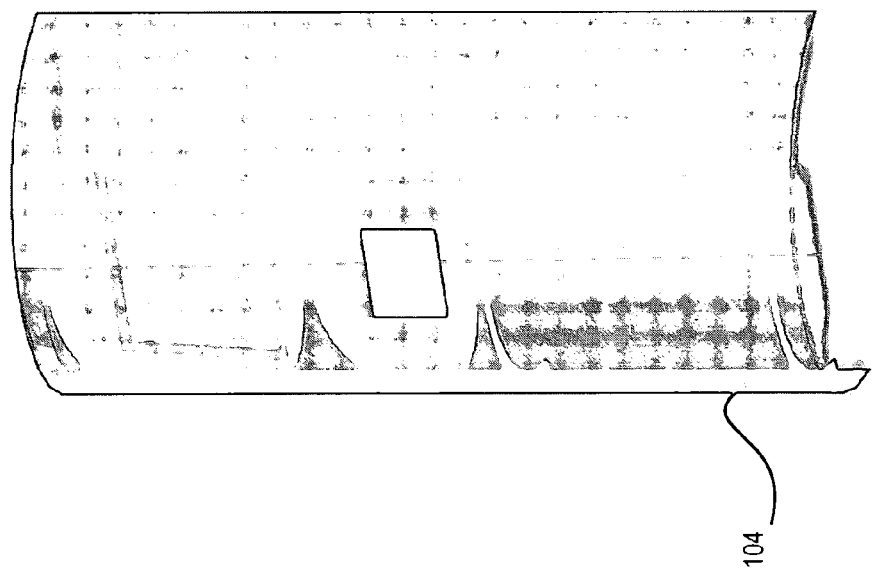
FIG. 2

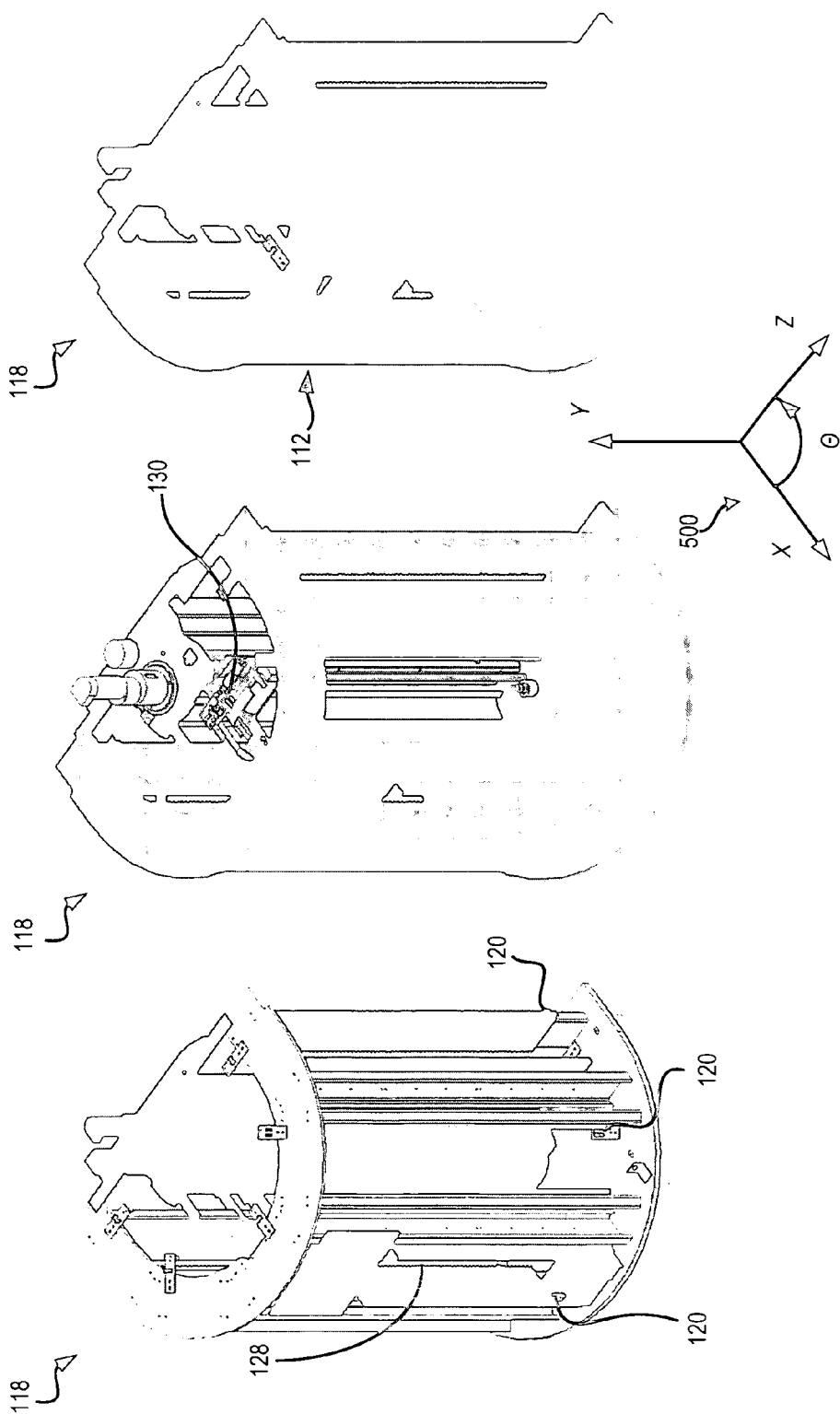

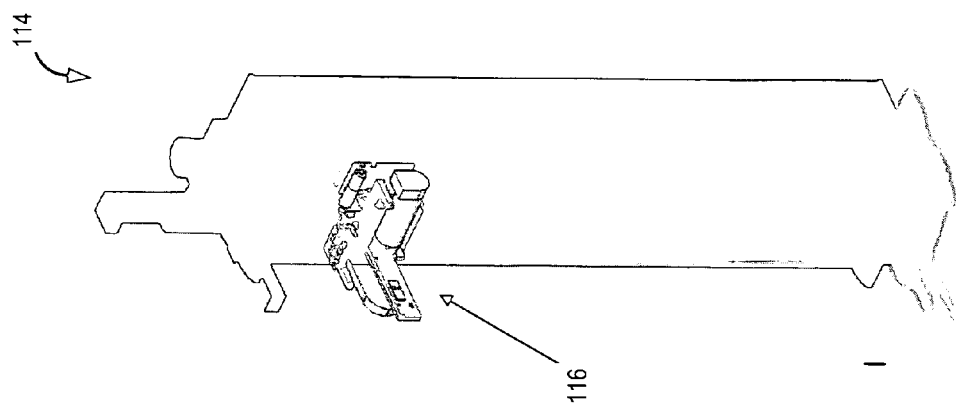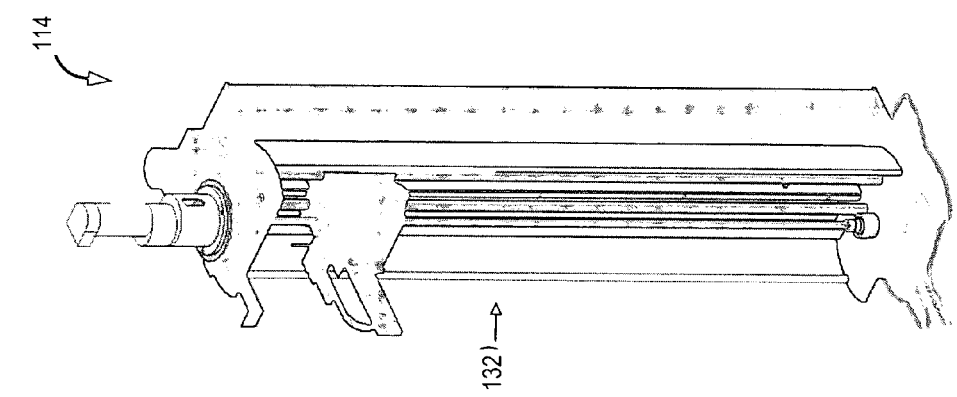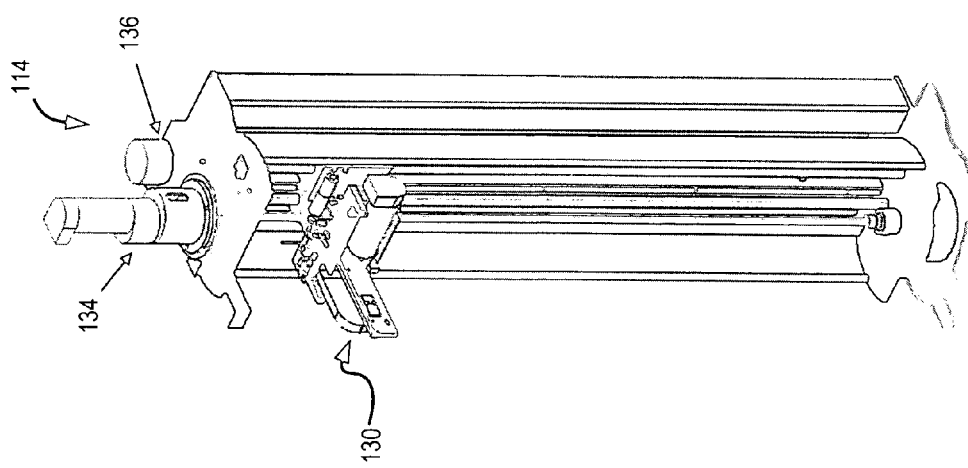

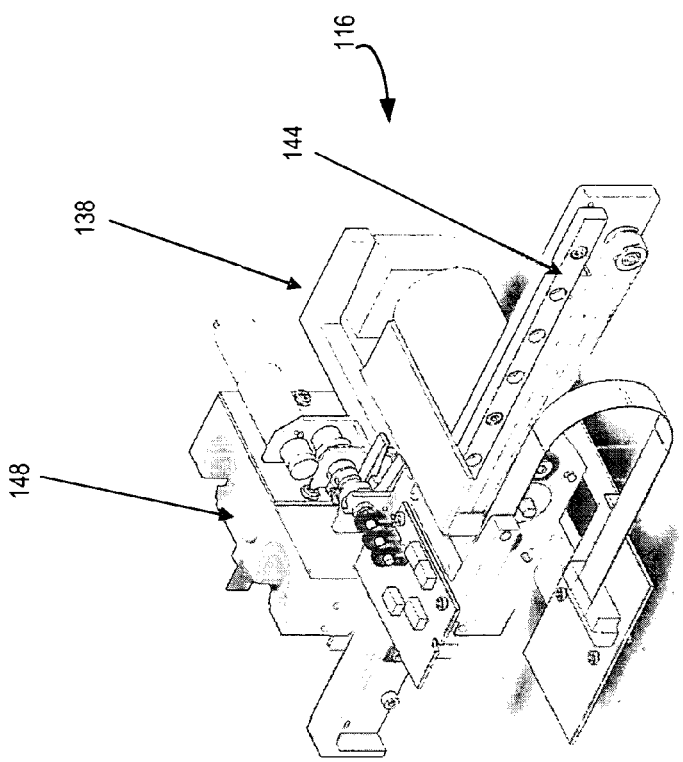
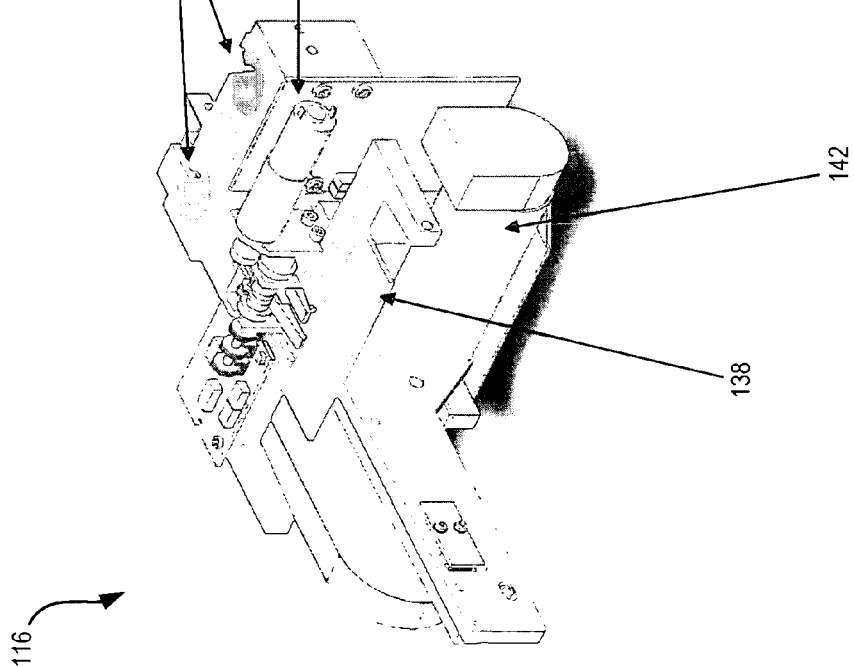
FIG. 7A
FIG. 7B

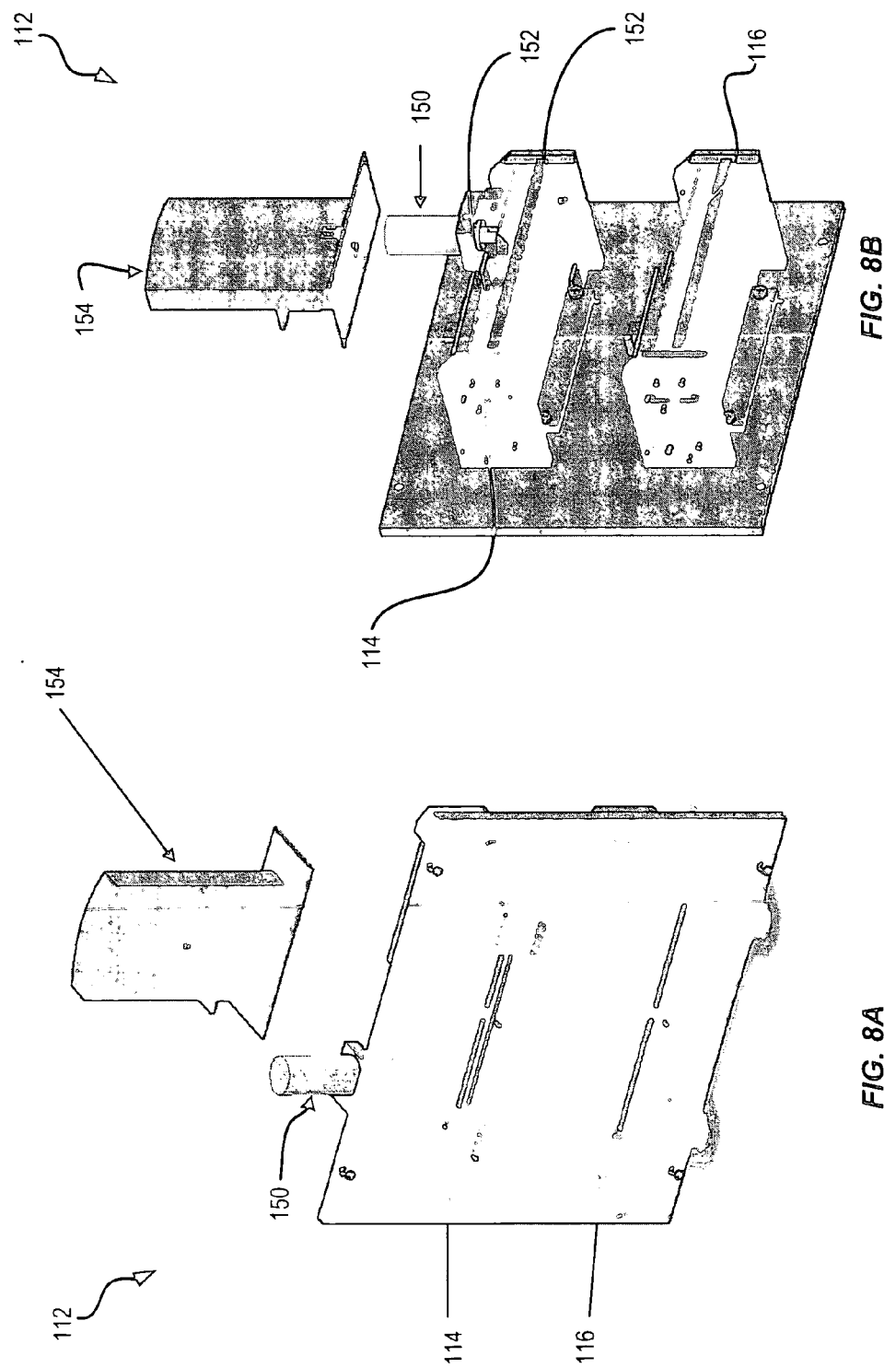

SYSTEM FOR AN AUTOMATED DISPENSING AND RETRIEVAL KIOSK FOR RECORDED MEDIA

CROSS-REFERENCE TO RELATED APPLICATIONS

This application claims benefit of priority to and is a continuation-in-part with respect to U.S. Provisional Patent Application No. 60/657,844, which was filed Mar. 1, 2005 and is incorporated herein by reference to the same extent as though fully replicated herein.

REFERENCE TO SEQUENCE LISTING

This specification is accompanied by sequence listings provided in the attached Appendices A-N, each of which are incorporated by reference as though fully replicated herein, and in the CD-ROM submitted herewith, in duplicate. The material submitted on CD-ROM also includes source code, submitted as Appendix N and also incorporated by reference as though fully replicated herein. Appendix N includes the following electronic files:

TABLE A

| FILENAME | DATE | SIZE |
| --- | --- | --- |
| app30_migration.sql | Oct. 2, 2003 | 1053 |
| delta_prod_data_migration.sql | Oct. 10, 2003 | 66319 |
| identity_reset.txt | Oct. 7, 2003 | 2022 |
| prod_data_migration.sql | Oct. 10, 2003 | 76378 |
| steps_data_migration.txt | Sep. 29, 2003 | 501 |
| v1.6newtables.sh | Jan. 9, 2004 | 1310 |
| v1.6proc.sh | Feb. 27, 2004 | 2871 |
| v1.6table.sql | Jan. 26, 2004 | 41721 |
| v1.6trigger.sh | Jan. 9, 2004 | 1381 |
| v1.6view.sh | Jan. 9, 2004 | 2353 |
| ffadddelinquent.sql | Jun. 18, 2003 | 915 |
| ffaddfranchisetitletypecap.sql | Sep. 5, 2003 | 798 |
| ffbjpopulatekioskdailysummary.sql | Oct. 30, 2003 | 1333 |
| ffbjpopulatereusablepromobydate.sql | Nov. 23, 2003 | 1538 |
| ffcheckconfirmrequest.sql | Nov. 25, 2003 | 1358 |
| ffcheckfailuretransaction.sql | Jul. 31, 2003 | 699 |
| ffcheckinvaidoptionid.sql | Jul. 31, 2003 | 440 |
| ffchecklastheartbeat.sql | Feb. 26, 2004 | 942 |
| ffconfirmlinestatus.sql | Oct. 8, 2003 | 1082 |
| ffcopyfranchise.sql | Dec. 4, 2003 | 14675 |
| ffcopykiosk.sql | Dec. 4, 2003 | 14460 |
| ffcopykioskgroup.sql | Dec. 4, 2003 | 5137 |
| ffcopykioskinventory.sql | Dec. 4, 2003 | 6687 |
| ffdeleteadmindisc.sql | Oct. 8, 2003 | 1051 |
| ffdeletedelinquent.sql | Oct. 30, 2003 | 584 |
| ffdeletefranchise.sql | Sep. 5, 2003 | 2079 |
| ffdeletekiosk.sql | Oct. 8, 2003 | 5018 |
| ffdeletekioskgroup.sql | Oct. 8, 2003 | 1588 |
| ffdeletepaymentcard.sql | Oct. 8, 2003 | 901 |
| ffdeletepricemodel.sql | Oct. 8, 2003 | 1611 |
| ffdeletepriceoption.sql | Oct. 8, 2003 | 1631 |
| ffdeletepromo.sql | Nov. 16, 2003 | 865 |
| ffdeletepromouse.sql | Nov. 16, 2003 | 870 |
| ffdeletespecialpricing.sql | Oct. 8, 2003 | 1168 |
| ffdeletetitle.sql | Oct. 8, 2003 | 2044 |
| ffgetalertemail.sql | Feb. 26, 2004 | 511 |
| ffgetdelinquentlines.sql | Nov. 16, 2003 | 290 |
| ffgetdenormtransactions.sql | Nov. 29, 2003 | 3704 |
| ffgetdisc.sql | Nov. 16, 2003 | 6987 |
| ffgetdiscallbyid.sql | Sep. 23, 2003 | 2274 |
| ffgetdiscbyid.sql | Nov. 16, 2003 | 2262 |
| ffgetfranchise.sql | Jul. 30, 2003 | 746 |
| ffgetfranchiseconfigurable.sql | Jan. 5, 2004 | 5711 |
| ffgetfranchiselist.sql | Aug. 28, 2003 | 1014 |
| ffgetfranchisetitletypecap.sql | Jul. 24, 2003 | 766 |
| ffgetfranchisetranslation.sql | Feb. 26, 2004 | 2476 |
| ffgetkioskaction.sql | Jul. 23, 2003 | 401 |
| ffgetkioskactionseqnum.sql | Jul. 23, 2003 | 532 |

TABLE A-continued

| FILENAME | DATE | SIZE |
| --- | --- | --- |
| ffgetkioskbasicstranslation.sql | Jul. 23, 2003 | 1896 |
| ffgetkioskinventory.sql | Jan. 9, 2004 | 4799 |
| ffgetkioskstatusdefinition.sql | Jul. 31, 2003 | 512 |
| ffgetkiosktaxrate.sql | Jul. 23, 2003 | 480 |
| ffgetkiosktimezone.sql | Nov. 6, 2003 | 631 |
| ffgetkiosktimezonebykioskid.sql | Nov. 6, 2003 | 542 |
| ffgetkiosktimezoneid.sql | Oct. 8, 2003 | 1126 |
| ffgetkiosktitle.sql | Jul. 16, 2003 | 1774 |
| ffgetlineitem.sql | Nov. 16, 2003 | 3076 |
| ffgetlineitembasic.sql | Nov. 16, 2003 | 2516 |
| ffgetlocale.sql | Nov. 16, 2003 | 1236 |
| ffgetoverduelines.sql | Nov. 16, 2003 | 306 |
| ffgetpayment.sql | Nov. 16, 2003 | 2761 |
| ffgetpaymentcard.sql | Nov. 16, 2003 | 2812 |
| ffgetpaymentcardbynumber.sql | Nov. 16, 2003 | 2816 |
| ffgetpaymentcardid.sql | Nov. 16, 2003 | 1346 |
| ffgetpaymentprocessor.sql | Nov. 16, 2003 | 1186 |
| ffgetplaylist.sql | Jan. 22, 2004 | 2446 |
| ffgetprocessorid.sql | Jul. 21, 2003 | 439 |
| ffgetnrocvendor.sql | Jul. 21, 2003 | 433 |
| ffgetpromocode.sql | Feb. 26, 2004 | 3410 |
| ffgetpromoid.sql | Jun. 19, 2003 | 779 |
| ffgetreceiptbasic.sql | Jun. 18, 2003 | 1101 |
| ffgetserverconfig.sql | Jun. 18, 2003 | 379 |
| ffgettitle.sql | Jul. 21, 2003 | 2242 |
| ffgettitlelist.sql | Jan. 20, 2004 | 8645 |
| ffgettransaction.sql | Jul. 21, 2003 | 2941 |
| ffgettransactionactioncount.sql | Aug. 6, 2003 | 959 |
| ffgettransactionbasic.sql | Nov. 16, 2003 | 1392 |
| ffgettransactionlinecount.sql | Jun. 20, 2003 | 595 |
| ffgettransactionpromoid.sql | Sep. 25, 2003 | 695 |
| ffgettransactiontotals.sql | Sep. 29, 2003 | 2478 |
| ffgettransactiontypeid.sql | Nov. 16, 2003 | 863 |
| ffgetunknowndiscbasic.sql | Aug. 26, 2003 | 596 |
| ffisdiscexist.sql | Nov. 16, 2003 | 516 |
| ffisinnochargeperiod.sql | Jun. 11, 2003 | 1301 |
| ffislineitemexist.sql | Jun. 11, 2003 | 485 |
| ffispaymentcardexist.sql | Jun. 19, 2003 | 754 |
| ffispaymentexist.sql | Jun. 19, 2003 | 479 |
| ffistransactionexist.sql | Jun. 11, 2003 | 505 |
| ffpadddefaultfranchisetitletypecap.sql | Oct. 8, 2003 | 1929 |
| ffpadddisc.sql | Oct. 14, 2003 | 1945 |
| ffpaddfranchisetranslation.sql | Oct. 3, 2003 | 1750 |
| ffpaddkioskbasicstranslation.sql | Oct. 3, 2003 | 1680 |
| ffpaddpropertygroupandmember.sql | Jan. 7, 2004 | 3514 |
| ffpdeletedisc.sql | Oct. 3, 2003 | 1621 |
| ffpdeletediscbykioskandslot.sql | Aug. 21, 2003 | 1639 |
| ffpdeletepropertygroupandmember.sql | Jan. 7, 2004 | 4471 |
| ffpgetdefaultlastupdatedby.sql | Jun. 11, 2003 | 441 |
| ffpgetpricemodeldependency.sql | Sep. 4, 2003 | 1073 |
| ffpgetpriceoptiondependency.sql | Sep. 5, 2003 | 1170 |
| ffpopulatelegacytitle.sql | Feb. 26, 2004 | 3080 |
| ffpopulatetitle.sql | Feb. 26, 2004 | 3635 |
| ffpsavefranchiseconfigurable.sql | Jan. 5, 2004 | 6384 |
| ffpsavepromo.sql | Feb. 26, 2004 | 2912 |
| ffpupdatedisc.sql | Aug. 19, 2003 | 2089 |
| ffpupdatefranchisetranslation.sql | Sep. 11, 2003 | 1944 |
| ffpupdatekioskbasicstranslation.sql | Sep. 4, 2003 | 1777 |
| ffptkioskactivity.sql | Nov. 26, 2003 | 5802 |
| ffrptkioskdailysummary.sql | Oct. 20, 2003 | 14118 |
| ffptreusablepromobydate.sql | Sep. 24, 2003 | 10651 |
| ffrptuigetvalidpromocodeid.sql | Oct. 7, 2003 | 1465 |
| ffptusedoncepromobydate.sql | Sep. 23, 2003 | 10309 |
| ffsaveadmindisc.sql | Oct. 19, 2003 | 4485 |
| ffsavedefaultkiosk.sql | Feb. 26, 2004 | 3601 |
| ffsavedisc.sql | Nov. 16, 2003 | 5153 |
| ffsavedischistory.sql | Nov. 16, 2003 | 1212 |
| ffsavefranchise.sql | Feb. 26, 2004 | 5581 |
| ffsavekiosk.sql | Feb. 26, 2004 | 6614 |
| ffsavekioskgroup.sql | Oct. 3, 2003 | 1846 |
| ffsavekioskslot.sql | Oct. 14, 2003 | 1515 |
| ffsavelineitem.sql | Feb. 26, 2004 | 5292 |
| ffsavelocale.sql | Nov. 16, 2003 | 1097 |
| ffsavepayment.sql | Nov. 16, 2003 | 3563 |
| ffsavepaymentcard.sql | Nov. 16, 2003 | 4646 |
| ffsaveplayitem.sql | Jan. 7, 2004 | 1871 |
| ffsaveplaylist.sql | Jan. 7, 2004 | 7827 |
| ffsavepricemodel.sql | Feb. 27, 2004 | 3747 |

TABLE A-continued

| FILENAME | DATE | SIZE |
|---|---|---|
| ffsavepriceoption.sql | Feb. 27, 2004 | 3792 |
| ffsavepromouse.sql | Nov. 16, 2003 | 2557 |
| ffsavepropertygroup.sql | Jan. 7, 2004 | 1228 |
| ffsavepropertygroupmember.sql | Jan. 7, 2004 | 968 |
| ffsavepropertyplayitempolicy.sql | Jan. 7, 2004 | 1336 |
| ffsaveregularpricing.sql | Feb. 27, 2004 | 2852 |
| ffsavereusablepromo.sql | Jul. 21, 2003 | 725 |
| ffsavespecialpricing.sql | Feb. 27, 2004 | 2870 |
| ffsavetitle.sql | Feb. 26, 2004 | 3910 |
| ffsavetitletranslation.sql | Feb. 26, 2004 | 3204 |
| ffsavetransaction.sql | Feb. 26, 2004 | 4630 |
| ffsaveuseoncepercardpromo.sql | Jul. 21, 2003 | 743 |
| ffsaveuseoncepromo.sql | Jul. 21, 2003 | 722 |
| ffupdatekioskaction.sql | Jul. 23, 2003 | 622 |
| ffupdatekioskbasics.sql | Oct. 8, 2003 | 1547 |
| ffupdatekiosklastalertnonstatus.sql | Jan. 6, 2004 | 1245 |
| ffupdatekiosklastalertstatus.sql | Jan. 6, 2004 | 1212 |
| ffupdatekioskping.sql | Nov. 16, 2003 | 1375 |
| ffupdatekiosksetup.sql | Oct. 8, 2003 | 4780 |
| ffupdatepromoline.sql | Nov. 16, 2003 | 1125 |
| ffupdatetitledescription.sql | Jan. 7, 2004 | 879 |
| fftdefaultpricing.sql | Jun. 23, 2003 | 706 |
| fftdelinquent.sql | Jul. 2, 2003 | 995 |
| fftdischistory.sql | Jun. 27, 2003 | 797 |
| fftdiscinventory.sql | Jun. 27, 2003 | 1256 |
| fftdiscstatus.sql | Aug. 15, 2003 | 550 |
| fftdwkioskdailysummary.sql | Sep. 11, 2003 | 863 |
| fftdwreusablepromobydate.sql | Sep. 24, 2003 | 670 |
| fftdwusedoncepromobydate.sql | Sep. 11, 2003 | 588 |
| fftformattranslation.sql | Jul. 21, 2003 | 601 |
| fftfranchise.sql | Nov. 16, 2003 | 1902 |
| fftfranchisetitletypecap.sql | Jul. 22, 2003 | 793 |
| fftfranchisetranslation.sql | Feb. 26, 2004 | 1288 |
| fftgenre.sql | Jul. 2, 2003 | 541 |
| fftgenretranslation.sql | Jul. 14, 2003 | 599 |
| fftgroupcode.sql | Nov. 16, 2003 | 542 |
| fftgroupcodekioskgroup.sql | Aug. 7, 2003 | 678 |
| fftkioskaction.sql | Jul. 22, 2003 | 592 |
| fftkioskbaiscstranslation.sql | Jul. 21, 2003 | 1093 |
| fftkioskbasics.sql | Nov. 16, 2003 | 1841 |
| fftkioskgroup.sql | Nov. 16, 2003 | 579 |
| fftkioskpaymentcardtype.sql | Nov. 16, 2003 | 606 |
| fftkiosksetup.sql | Nov. 16, 2003 | 1897 |
| fftkioskslot.sql | Sep. 4, 2003 | 671 |
| fftkioskstatus.sql | Feb. 26, 2004 | 1017 |
| fftlineitem.sql | Nov. 16, 2003 | 1623 |
| fftlocale.sql | Nov. 16, 2003 | 740 |
| fftlogin.sql | Nov. 16, 2003 | 668 |
| fftloginrole.sql | Nov. 16, 2003 | 522 |
| fftlookup.sql | Jul. 10, 2003 | 624 |
| fftlookuptranslation.sql | Jul. 21, 2003 | 723 |
| fftlookuptype.sql | Jun. 27, 2003 | 523 |
| fftmedia.sql | Jul. 21, 2003 | 679 |
| fftoperation.sql | Aug. 27, 2003 | 542 |
| fftpage.sql | Nov. 16, 2003 | 611 |
| fftpayment.sql | Nov. 16, 2003 | 1096 |
| fftpaymentcard.sql | Nov. 16, 2003 | 1270 |
| fftpaymentcardtype.sql | Nov. 16, 2003 | 654 |
| fftpaymentcardtypetranslation.sql | Nov. 16, 2003 | 696 |
| fftplaylist.sql | Nov. 16, 2003 | 964 |
| fftpricemodel.sql | Jul. 21, 2003 | 581 |
| fftpriceoption.sql | Jul. 21, 2003 | 595 |
| fftprocessor.sql | Jun. 27, 2003 | 551 |
| fftpromo.sql | Feb. 26, 2004 | 928 |
| fftpromotype.sql | Jun. 27, 2003 | 573 |
| fftpromouse.sql | Jun. 27, 2003 | 687 |
| fftpropertygroup.sql | Jan. 20, 2004 | 874 |
| fftpropertygroupmember.sql | Dec. 30, 2003 | 738 |
| fftpropertyplayitem.sql | Dec. 30, 2003 | 991 |
| fftpropertyplayitempolicy.sql | Dec. 30, 2003 | 791 |
| fftrating.sql | Jun. 23, 2003 | 572 |
| fftratingsystem.sql | Jun. 23, 2003 | 578 |
| fftregularpricing.sql | Nov. 16, 2003 | 1009 |
| fftresource.sql | Jul. 15, 2003 | 633 |
| fftrole.sql | Jul. 25, 2003 | 592 |
| fftrolepagerights.sql | Jun. 23, 2003 | 645 |
| fftsequence.sql | Jun. 11, 2003 | 545 |
| fftserverconfig.sql | Nov. 16, 2003 | 665 |

TABLE A-continued

| FILENAME | DATE | SIZE |
|---|---|---|
| fftsitetype.sql | Jun. 23, 2003 | 519 |
| fftspecialpricing.sql | Nov. 16, 2003 | 1053 |
| ffttexttransalation.sql | Nov. 16, 2003 | 692 |
| ffttimezonetranslation.sql | Jan. 9, 2004 | 625 |
| ffttitle.sql | Nov. 16, 2003 | 1176 |
| ffttitletranslation.sql | Nov. 16, 2003 | 1022 |
| ffttitletype.sql | Nov. 16, 2003 | 536 |
| ffttitletypetranslation.sql | Feb. 26, 2004 | 661 |
| ffttmpident.sql | Oct. 5, 2003 | 522 |
| ffttransaction.sql | Nov. 16, 2003 | 1489 |
| tr_fftdefaultpricing_u.sql | Sep. 19, 2003 | 384 |
| tr_fftdelinquent_u.sql | Oct. 10, 2003 | 360 |
| tr_fftdischistory_u.sql | Nov. 16, 2003 | 368 |
| tr_fftdiscinventory_u.sql | Nov. 16, 2003 | 376 |
| tr_fftdiscstatus_u.sql | Aug. 15, 2003 | 361 |
| tr_fftforniattranslation_u.sql | Oct. 10, 2003 | 442 |
| tr_fftfranchisetitletypecap_u.sql | Jul. 22, 2003 | 530 |
| tr_fftfranchisetranslation_u.sql | Sep. 19, 2003 | 462 |
| tr_fftfranchise_u.sql | Aug. 7, 2003 | 354 |
| tr_fftgenretranslation_u.sql | Sep. 19, 2003 | 435 |
| tr_fftgenre_u.sql | Sep. 19, 2003 | 326 |
| tr_fftgroupcodekioskgroup_u.sql | Aug. 7, 2003 | 466 |
| tr_ffgroupcode_u.sql | Aug. 7, 2003 | 354 |
| tr_fftkioskaction_u.sql | Jul. 22, 2003 | 416 |
| tr_fftkioskbasicstranslation_u.sql | Sep. 4, 2003 | 464 |
| tr_fftkioskbasics_u.sql | Jul. 29, 2003 | 356 |
| tr_fftkioskgroup_u.sql | Oct. 10, 2003 | 361 |
| tr_fftkioskpaymentcardtype_u.sql | Jul. 25, 2003 | 473 |
| tr_fftkiosksetup_u.sql | Oct. 10, 2003 | 353 |
| tr_fftkioskslot_u.sql | Sep. 4, 2003 | 392 |
| tr_fftkioskstatus_u.sql | Oct. 10, 2003 | 356 |
| tr_fftlineitem_u.sql | Nov. 16, 2003 | 347 |
| tr_fflocale_u.sql | Nov. 16, 2003 | 333 |
| tr_fftloginrole_u.sql | Jul. 25, 2003 | 396 |
| tr_fftlogin_u.sql | Jul. 25, 2003 | 386 |
| tr_fftlookuptranslation_u.sql | Oct. 10, 2003 | 444 |
| tr_fftlookuptype_u.sql | Oct. 10, 2003 | 351 |
| tr_fftlookup_u.sql | Oct. 10, 2003 | 335 |
| tr_fftoperation_u.sql | Aug. 26, 2003 | 354 |
| tr_fftpage_u.sql | Oct. 10, 2003 | 319 |
| tr_fftpaymentcardtypetranslation_u.sql | Jul. 25, 2003 | 505 |
| tr_fftpaymentcardtype_u.sql | Jul. 25, 2003 | 396 |
| tr_fftpaymentcard_u.sql | Nov. 16, 2003 | 368 |
| tr_fftpayment_u.sql | Nov. 16, 2003 | 340 |
| tr_fftplaylist_u.sql | Aug. 1, 2003 | 519 |
| tr_fftpricemodel_u.sql | Oct. 10, 2003 | 421 |
| tr_fftpriceoptionu.sql | Oct. 10, 2003 | 428 |
| tr_fftprocessor_u.sql | Oct. 10, 2003 | 354 |
| tr_fftpromotype_u.sql | Oct. 10, 2003 | 355 |
| tr_fftpromouse_u.sql | Oct. 10, 2003 | 348 |
| tr_fftpromo_u.sql | Oct. 10, 2003 | 328 |
| tr_fftpropertygroupmember_u.sql | Dec. 30, 2003 | 528 |
| tr_fftpropertygroup_u.sql | Dec. 30, 2003 | 382 |
| tr_fftpropertyplayitempolicy_u.sql | Dec. 30, 2003 | 429 |
| tr_fftpropertyplayitem_u.sql | Dec. 30, 2003 | 387 |
| tr_fftratingsystemu.sql | Oct. 10, 2003 | 375 |
| tr_fftrating_u.sql | Oct. 10, 2003 | 333 |
| tr_fftregularpricing_u.sql | Aug. 27, 2003 | 389 |
| tr_fftrolepagerights_u.sql | Oct. 10, 2003 | 459 |
| tr_fftrole_u.sql | Jul. 25, 2003 | 319 |
| tr_fftserverconfig_u.sql | Jul. 31, 2003 | 375 |
| tr_fftsitetype_u.sql | Oct. 10, 2003 | 347 |
| tr_fftspecialpricing_u.sql | Aug. 27, 2003 | 389 |
| tr_ffttexttranslation_u.sql | Jul. 22, 2003 | 468 |
| tr_ffttimezonetranslation_u.sql | Jan. 9, 2004 | 456 |
| tr_ffttitletranslation_u.sql | Aug. 26, 2003 | 435 |
| tr_ffititletypetranslation_u.sql | Jul. 25, 2003 | 463 |
| tr_ffttitletype_u.sql | Jul. 25, 2003 | 354 |
| tr_ffttitle_u.sql | Aug. 26, 2003 | 326 |
| tr_ffttransaction_u.sql | Nov. 16, 2003 | 368 |
| ffdefaultpricing.sql | Jun. 23, 2003 | 586 |
| ffdelinquent.sql | Jun. 18, 2003 | 672 |
| ffdiscdetail.sql | Jul. 4, 2003 | 426 |
| ffdischistory.sql | Jun. 27, 2003 | 596 |
| ffdiscinventory.sql | Nov. 16, 2003 | 1358 |
| ffdiscinventoryall.sql | Sep. 23, 2003 | 1341 |
| ffdiscstatus.sql | Aug. 15, 2003 | 420 |
| ffdwkioskdailysummary.sql | Sep. 11, 2003 | 756 |

TABLE A-continued

| FILENAME | DATE | SIZE |
|---|---|---|
| ffdwreusablepromobydate.sql | Sep. 11, 2003 | 539 |
| ffdwusedoncepromobydate.sql | Sep. 11, 2003 | 472 |
| ffformattranslation.sql | Jul. 15, 2003 | 470 |
| fffranchise.sql | Nov. 16, 2003 | 900 |
| fffranchiseandprocessor.sql | Oct. 19, 2003 | 1205 |
| fffranchiseandtranslation.sql | Feb. 26, 2004 | 1843 |
| fffranchisetitletypecap.sql | Aug. 29, 2003 | 655 |
| fffranchisetranslation.sql | Feb. 26, 2004 | 1050 |
| ffgenre.sql | Nov. 16, 2003 | 442 |
| ffgenreandtranslation.sql | Nov. 16, 2003 | 710 |
| ffgenretranslation.sql | Nov. 16, 2003 | 480 |
| ffgraphicplaylist.sql | Jan. 27, 2004 | 4078 |
| ffgroupcode.sql | Nov. 16, 2003 | 433 |
| ffgroupcodekioskgroup.sql | Aug. 29, 2003 | 514 |
| ffkiosk.sql | Nov. 16, 2003 | 1130 |
| ffkioskaction.sql | Aug. 29, 2003 | 505 |
| ffkioskbadslot.sql | Sep. 4, 2003 | 281 |
| ffkioskbasics.sql | Nov. 16, 2003 | 1679 |
| ffkioskbasicsandsetup.sql | Nov. 16, 2003 | 1734 |
| ffkioskbasicsandtranslation.sql | Nov. 16, 2003 | 2460 |
| ffkioskbasicstranslation.sql | Nov. 16, 2003 | 952 |
| ffkioskgenre.sql | Nov. 16, 2003 | 636 |
| ffkioskgroup.sql | Nov. 16, 2003 | 476 |
| ffkioskgroupcode.sql | Nov. 16, 2003 | 764 |
| ffkiosklocale.sql | Nov. 16, 2003 | 575 |
| ffkioskpaymentcard.sql | Nov. 16, 2003 | 2203 |
| ffkioskpaymentcardtype.sql | Nov. 16, 2003 | 515 |
| ffkioskproperty.sql | Jan. 8, 2004 | 936 |
| ffkioskrating.sql | Nov. 16, 2003 | 642 |
| ffkioskratingsystem.sql | Nov. 16, 2003 | 634 |
| ffkioskregularpricing.sql | Feb. 26, 2004 | 750 |
| ffkioskrolelogin.sql | Aug. 29, 2003 | 1254 |
| ffkioskrolepage.sql | Sep. 29, 2003 | 499 |
| ffkiosksetup.sql | Nov. 16, 2003 | 2090 |
| ffkioskslot.sql | Sep. 4, 2003 | 459 |
| ffkioskslotoffset.sql | Sep. 4, 2003 | 291 |
| ffkioskspecialpricing.sql | Feb. 26, 2004 | 791 |
| ffkioskstatus.sql | Feb. 26, 2004 | 949 |
| ffkiosktexttranslation.sql | Nov. 16, 2003 | 1186 |
| ffkiosktitle.sql | Nov. 16, 2003 | 1444 |
| ffkiosktitletype.sql | Feb. 26, 2004 | 1725 |
| ffkiosktitletypecap.sql | Feb. 26, 2004 | 1782 |
| fflineitem.sql | Nov. 16, 2003 | 1892 |
| fflocale.sql | Nov. 16, 2003 | 615 |
| fflogin.sql | Nov. 16, 2003 | 538 |
| ffloginrole.sql | Nov. 16, 2003 | 420 |
| fflookup.sql | Jul. 15, 2003 | 564 |
| fflookupandtranslation.sql | Nov. 16, 2003 | 1261 |
| fflookuptranslation.sql | Nov. 16, 2003 | 608 |
| fflookuptype.sql | Nov. 16, 2003 | 429 |
| ffmedia.sql | Nov. 16, 2003 | 556 |
| ffmediaplaylist.sql | Nov. 16, 2003 | 668 |
| ffoperation.sql | Aug. 29, 2003 | 433 |
| ffpage.sql | Nov. 16, 2003 | 480 |
| ffpayment.sql | Nov. 16, 2003 | 1296 |
| ffpaymentcard.sql | Nov. 16, 2003 | 1181 |
| ffpaymentcardtype.sql | Nov. 16, 2003 | 494 |
| ffpaymentcardtypeandtranslation.sql | Nov. 16, 2003 | 861 |
| ffpaymentcardtypetranslation.sql | Nov. 16, 2003 | 575 |
| ffpricemodel.sql | Nov. 16, 2003 | 478 |
| ffpriceoption.sql | Nov. 16, 2003 | 485 |
| ffprocessor.sql | Nov. 16, 2003 | 457 |
| ffpromo.sql | Nov. 16, 2003 | 718 |
| ffpromoall.sql | Sep. 23, 2003 | 702 |
| ffpromotype.sql | Nov. 16, 2003 | 433 |
| ffpromouse.sql | Nov. 16, 2003 | 619 |
| ffpropertygroup.sql | Dec. 30, 2003 | 611 |
| ffpropertygroupmember.sql | Dec. 30, 2003 | 522 |
| ffpropertyplayitem.sql | Dec. 30, 2003 | 661 |
| ffpropertyplayitempolicy.sql | Dec. 30, 2003 | 627 |
| ffrating.sql | Nov. 16, 2003 | 492 |
| ffratingsystem.sql | Nov. 16, 2003 | 493 |
| ffregularpricing.sql | Nov. 16, 2003 | 789 |
| ffresource.sql | Nov. 16, 2003 | 538 |
| ffrole.sql | Aug. 29, 2003 | 490 |
| ffrolepagerights.sql | Nov. 16, 2003 | 554 |
| ffsequence.sql | Jun. 11, 2003 | 487 |
| ffserverconfig.sql | Nov. 16, 2003 | 510 |

TABLE A-continued

| FILENAME | DATE | SIZE |
|---|---|---|
| ffsitetype.sql | Nov. 16, 2003 | 426 |
| ffspecialpricing.sql | Nov. 16, 2003 | 805 |
| ffstaticplaylist.sql | Nov. 16, 2003 | 587 |
| fftexttranslation.sql | Nov. 16, 2003 | 538 |
| fftimezonetranslation.sql | Jan. 11, 2004 | 506 |
| fftitle.sql | Nov. 16, 2003 | 991 |
| fftitleandtranslation.sql | Nov. 16, 2003 | 1465 |
| fftitletranslation.sql | Nov. 16, 2003 | 660 |
| fftitletype.sql | Nov. 16, 2003 | 431 |
| fftitletypeandtranslation.sql | Feb. 26, 2004 | 783 |
| fftitletypetranslation.sql | Feb. 26, 2004 | 553 |
| fftransaction.sql | Jul. 21, 2003 | 1164 |
| ffuser.sql | Jul. 15, 2003 | 626 |
| ffvideoplaylist.sql | Jan. 27, 2004 | 4730 |
| adjustment.sql | Jan. 22, 2004 | 410 |
| aem.sql | Jan. 22, 2004 | 1108 |
| discinventory.sql | Jan. 22, 2004 | 776 |
| lineitem.sql | Jan. 22, 2004 | 794 |
| promo.sql | Jan. 22, 2004 | 1904 |
| title.sql | Feb. 27, 2004 | 5011 |
| transaction.sql | Jan. 22, 2004 | 4195 |
| userpaymentcard.sql | Jan. 22, 2004 | 639 |
| aemcomm.txt | May 22, 2003 | 1441 |
| formmail.pl | May 19, 2003 | 29889 |
| admin.web.xml | Feb. 26, 2004 | 15414 |
| aemserver.properties | Aug. 19, 2003 | 553 |
| aemserver.web.xml | Nov. 4, 2003 | 531 |
| ffserver.properties | Feb. 26, 2004 | 1802 |
| log.properties | Jul. 23, 2003 | 43 |
| web.xml | Nov. 16, 2003 | 13129 |
| datepicker.js | Feb. 26, 2004 | 16723 |
| dateutility.js | Oct. 7, 2003 | 3794 |
| navigation.js | Jun. 15, 2003 | 530 |
| simple.css | Sep. 26, 2003 | 2238 |
| utility.js | Feb. 26, 2004 | 2388 |
| admin.jsp | Nov. 16, 2003 | 3411 |
| companygroupdetails.jsp | Feb. 26, 2004 | 24135 |
| companygrouplist.jsp | Feb. 26, 2004 | 9086 |
| companygroupquery.jsp | Feb. 26, 2004 | 6226 |
| customerdetails.jsp | Feb. 26, 2004 | 10945 |
| customerhistory.jsp | Nov. 16, 2003 | 9781 |
| customerlist.jsp | Feb. 26, 2004 | 9766 |
| customerquery.jsp | Feb. 26, 2004 | 4986 |
| dataexport.jsp | Feb. 26, 2004 | 13133 |
| discdetails.jsp | Feb. 26, 2004 | 13141 |
| disclist.jsp | Feb. 26, 2004 | 13971 |
| discquery.jsp | Feb. 26, 2004 | 4954 |
| dumprequest.jsp | Jun. 19, 2003 | 1038 |
| dvdplayererror.jsp | Nov. 16, 2003 | 1452 |
| formatlookup.jsp | Nov. 16, 2003 | 7975 |
| formatnamelookup.jsp | Nov. 16, 2003 | 9596 |
| genrelookup.jsp | Nov. 16, 2003 | 8890 |
| genrenamelookup.jsp | Nov. 16, 2003 | 9617 |
| helplist.jsp | Nov. 16, 2003 | 6460 |
| kioskdetails.jsp | Feb. 26, 2004 | 25905 |
| kiosklist.jsp | Feb. 26, 2004 | 10433 |
| kioskquery.jsp | Feb. 26, 2004 | 6167 |
| kioskreporterrorpage.jsp | Jun. 15, 2003 | 447 |
| kioskstatus.jsp | Nov. 16, 2003 | 7546 |
| languagelookup.jsp | Nov. 16, 2003 | 8473 |
| latefeenotify.jsp | Feb. 26, 2004 | 5916 |
| login.jsp | Nov. 16, 2003 | 1570 |
| lookuptablesmenu.jsp | Nov. 16, 2003 | 5503 |
| marketing.jsp | Dec. 31, 2003 | 4272 |
| marketingcommercialdeployment.jsp | Jan. 23, 2004 | 1799 |
| marketingcorporatetools.jsp | Jan. 23, 2004 | 3642 |
| marketingfranchisereporting.jsp | Jan. 23, 2004 | 1767 |
| menuheader.jsp | Feb. 26, 2004 | 3539 |
| pricemodellookup.jsp | Feb. 26, 2004 | 9321 |
| priceoptionlookup.jsp | Feb. 26, 2004 | 8828 |
| pricing.jsp | Nov. 16, 2003 | 26132 |
| promodetails.jsp | Feb. 26, 2004 | 12625 |
| promolist.jsp | Feb. 26, 2004 | 8487 |
| promonotify.jsp | Feb. 26, 2004 | 2569 |
| querypage.jsp | Nov. 16, 2003 | 8023 |
| ratinglookup.jsp | Nov. 16, 2003 | 10956 |
| ratingsystemlookup.jsp | Nov. 16, 2003 | 9333 |
| refundreceipt.jsp | Feb. 26, 2004 | 5876 |

TABLE A-continued

| FILENAME | DATE | SIZE |
|---|---|---|
| rentalreceipt.jsp | Feb. 26, 2004 | 7311 |
| reports.jsp | Feb. 26, 2004 | 11091 |
| reportsquery.jsp | Feb. 26, 2004 | 26836 |
| reportsreusablecode.jsp | Nov. 16, 2003 | 9134 |
| showdvdplayexception.jsp | Jun. 19, 2003 | 176 |
| sitetypelookup.jsp | Nov. 16, 2003 | 8381 |
| titledetails.jsp | Feb. 26, 2004 | 41079 |
| titlehst.jsp | Feb. 26, 2004 | 11416 |
| titlequery.jsp | Feb. 26, 2004 | 7521 |
| titletypelookup.jsp | Nov. 16, 2003 | 8259 |
| titletypenamelookup.jsp | Nov. 16, 2003 | 9782 |
| trailers.jsp | Jan. 23, 2004 | 8410 |
| transactiondetails.jsp | Feb. 26, 2004 | 38104 |
| transactionlist.jsp | Feb. 26, 2004 | 14931 |
| transactionquery.jsp | Feb. 26, 2004 | 4630 |
| viewlogfile.jsp | Jun. 15, 2003 | 881 |
| adminenvironment.java | Nov. 16, 2003 | 10478 |
| adminserversession.java | Oct. 3, 2003 | 1372 |
| adminservlet.java | Feb. 26, 2004 | 20648 |
| cmdgetconstants.java | Feb. 26, 2004 | 1640 |
| cmdgethelp.java | Nov. 16, 2003 | 1046 |
| cmdgetinit.java | Feb. 26, 2004 | 48624 |
| cmdgetlookuptables.java | Feb. 26, 2004 | 4318 |
| cmdgetreports.java | Nov. 16, 2003 | 1900 |
| command.java | Nov. 16, 2003 | 356 |
| commandexception.java | Jun. 15, 2003 | 341 |
| commandtoken.java | Nov. 16, 2003 | 2381 |
| ffserverproperties.java | Nov. 16, 2003 | 3418 |
| aem.java | Apr. 17, 2004 | 110537 |
| aemapp.java | Feb. 26, 2004 | 13310 |
| aemexception.java | Jun. 4, 2003 | 362 |
| aemfactory.java | Mar. 1, 2004 | 375 |
| arm.java | Mar. 25, 2004 | 4836 |
| armexception.java | Jun. 4, 2003 | 303 |
| barcode.java | Jun. 4, 2003 | 330 |
| barcodereader.java | Nov. 16, 2003 | 1467 |
| bootstrap.java | Mar. 10, 2004 | 1427 |
| carousel.java | Mar. 25, 2004 | 10104 |
| carouselexception.java | Jun. 4, 2003 | 311 |
| cmdgetkioskdetails.java | Feb. 26, 2004 | 24743 |
| cmdgetkiosklist.java | Feb. 26, 2004 | 21084 |
| cmdgetkioskstatus.java | Nov. 16, 2003 | 6812 |
| creditcard.java | Aug. 29, 2003 | 391 |
| creditcardreader.java | Nov. 16, 2003 | 467 |
| creditcardthread.java | Nov. 16, 2003 | 3397 |
| door.java | Mar. 25, 2004 | 5958 |
| doorexception.java | Jun. 4, 2003 | 304 |
| dpec.java | Apr. 6, 2004 | 12744 |
| fight.'ava | Mar. 10, 2004 | 1031 |
| lightexception.java | Jun. 4, 2003 | 304 |
| nmc.java | Nov. 16, 2003 | 3431 |
| roller.java | Mar. 4, 2004 | 1360 |
| rollerexception.java | Jun. 4, 2003 | 307 |
| sensor.java | Mar. 4, 2004 | 650 |
| servo.java | Apr. 17, 2004 | 6865 |
| servocallback.java | Apr. 6, 2004 | 10638 |
| servocallbackfactory.java | Mar. 10, 2004 | 799 |
| servoex.java | Apr. 17, 2004 | 41228 |
| servoexception.java | Jun. 5, 2003 | 304 |
| servofactory.java | Apr. 1, 2004 | 2627 |
| servoplus.java | Apr. 19, 2004 | 9392 |
| servoprime.java | Feb. 23, 2004 | 199 |
| comm.java | Feb. 26, 2004 | 14481 |
| commexception.java | Jun. 17, 2003 | 359 |
| aemgui.java | Mar. 30, 2004 | 17844 |
| commandmap.java | Mar. 24, 2004 | 20760 |
| tools.java | Mar. 30, 2004 | 10031 |
| aemserver.java | Nov. 16, 2003 | 9960 |
| aemserverconfig.java | Nov. 16, 2003 | 2212 |
| checkpromocodecommand.java | Feb. 26, 2004 | 7626 |
| command.java | Nov. 16, 2003 | 730 |
| commandfactory.java | Nov. 16, 2003 | 3982 |
| confirmdispense.java | Feb. 27, 2004 | 12432 |
| discremoved.java | Nov. 16, 2003 | 10112 |
| discreturned.java | Nov. 16, 2003 | 10720 |
| garbagecollect.java | Sep. 10, 2003 | 2560 |
| getreceipt.java | Feb. 26, 2004 | 6094 |
| monitorserver.java | Sep. 10, 2003 | 2364 |
| ping.java | Nov. 16, 2003 | 13243 |
| processpayment.java | Feb. 26, 2004 | 11065 |
| servletutils.java | Feb. 26, 2004 | 6180 |
| abstractbottombar.java | Jun. 4, 2003 | 1474 |
| abstractcontentbar.java | Feb. 26, 2004 | 8080 |
| abstracthardwarethread.java | Mar. 1, 2004 | 1797 |
| abstracttoolspanel.java | Mar. 3, 2004 | 21520 |
| abstracttopbar.java | Jun. 4, 2003 | 1328 |
| baseactionlistener.java | Jan. 21, 2004 | 1266 |
| cmdgetlanguagelookup.java | Nov. 16, 2003 | 17175 |
| dvdplaybase.java | Apr. 1, 2004 | 84945 |
| dvdplaylocale.java | Oct. 28, 2003 | 3642 |
| datapacket.dtd | May 23, 2003 | 282 |
| datapacketcomposer.java | Feb. 26, 2004 | 23560 |
| nvpair.java | May 23, 2003 | 2641 |
| nvpairset.java | May 23, 2003 | 2413 |
| rcset.java | Jun. 13, 2003 | 4183 |
| rdatasetfieldvalues.java | May 23, 2003 | 1631 |
| rmetafield.java | May 23, 2003 | 2608 |
| rmetarow.java | May 23, 2003 | 2736 |
| admindatamodule.java | Feb. 26, 2004 | 77453 |
| admindatamoduleconstants.java | Feb. 26, 2004 | 63002 |
| column.java | Jul. 7, 2003 | 3371 |
| databaseexception.java | Jun. 15, 2003 | 336 |
| databaseutil.java | Jun. 15, 2003 | 2349 |
| dataprovider.java | Nov. 16, 2003 | 885 |
| dataproviderfactory.java | Nov. 16, 2003 | 3952 |
| dataproviderpool.java | Nov. 16, 2003 | 5781 |
| datarow.java | Jul. 7, 2003 | 4083 |
| datastorage.java | Feb. 26, 2004 | 4309 |
| ffserver.properties | Jul. 7, 2003 | 1384 |
| idataprovider.java | Jun. 4, 2003 | 780 |
| idataproviderfactory.java | Jun. 4, 2003 | 754 |
| iprocedure.java | Feb. 26, 2004 | 2480 |
| iquery.java | Nov. 16, 2003 | 9317 |
| locate.java | Jul. 7, 2003 | 321 |
| logindatamodule.java | Feb. 26, 2004 | 15240 |
| parameterrow.java | Jul. 7, 2003 | 1834 |
| proceduredataset.java | Jul. 7, 2003 | 1222 |
| querydataset.java | Feb. 26, 2004 | 11611 |
| sqlstates.java | Jul. 15, 2003 | 338 |
| variant.java | Jul. 7, 2003 | 11119 |
| variantformatter.java | Jul. 7, 2003 | 961 |
| mssqldataprovider.java | Nov. 16, 2003 | 6400 |
| mssqlprocedure.java | Feb. 26, 2004 | 64208 |
| mssqlproviderfactory.java | Nov. 16, 2003 | 1580 |
| mssqlquery.java | Nov. 16, 2003 | 48502 |
| ibusinesstransaction.java | Jun. 17, 2003 | 656 |
| domdata.java | Mar. 19, 2004 | 70532 |
| domdataexception.java | Aug. 7, 2003 | 363 |
| persistencedata.java | Feb. 26, 2004 | 11344 |
| aemserverobjectexception.java | Jun. 4, 2003 | 718 |
| dataaccessexception.java | Jun. 4, 2003 | 1206 |
| dvdexception.java | Jun. 15, 2003 | 260 |
| dvdplayexception.java | Jul. 2, 2003 | 1697 |
| exceptioncodes.iava | Feb. 26, 2004 | 4327 |
| authorizingpaymentcard.java | Feb. 26, 2004 | 4798 |
| badslots.java | Nov. 16, 2003 | 2799 |
| barcampegtest.java | Mar. 4, 2004 | 4855 |
| cardreaderhid.java | Nov. 16, 2003 | 3626 |
| controller.java | Feb. 27, 2004 | 524 |
| controllerex.java | Mar. 4, 2004 | 19133 |
| controllerplus.java | Mar. 1, 2004 | 254 |
| cycletest.java | Apr. 9, 2004 | 14916 |
| deliveringdvd.java | Nov. 16, 2003 | 2299 |
| detectingdiscin.java | Mar. 10, 2004 | 1091 |
| errorlog.java | Jun. 6, 2003 | 505 |
| helpmain.java | Feb. 26, 2004 | 2251 |
| identifyingdisc.java | Nov. 16, 2003 | 1362 |
| initializingaem.java | Mar. 4, 2004 | 1197 |
| inventorycheck.java | Apr. 9, 2004 | 15969 |
| login.java | Mar. 1, 2004 | 1764 |
| main.java | Apr. 1, 2004 | 1689 |
| operator.java | Mar. 30, 2004 | 4441 |
| pushingdiscalltheway.java | Mar. 19, 2004 | 1938 |
| removediscs.java | Mar. 30, 2004 | 7925 |
| removedvd.java | Apr. 1, 2004 | 2597 |
| returnerror.java | Mar. 24, 2004 | 1930 |

TABLE A-continued

| FILENAME | DATE | SIZE |
|---|---|---|
| returningmovie.java | Mar. 19, 2004 | 1710 |
| servoparams.java | Mar. 3, 2004 | 274 |
| servoparamsex.java | Mar. 4, 2004 | 10979 |
| simpleremovediscs.java | Mar. 4, 2004 | 6629 |
| slotcal.java | Mar. 3, 2004 | 270 |
| slotcalex.java | Mar. 4, 2004 | 27924 |
| swipepaymentcard.java | Nov. 16, 2003 | 2478 |
| unabletorecognizemovie.java | Mar. 24, 2004 | 1727 |
| cmdgetdiscdetails.java | Feb. 26, 2004 | 10017 |
| cmdgetdisclist.java | Feb. 26, 2004 | 16122 |
| cmdgetformatlookup.java | Nov. 16, 2003 | 15415 |
| cmdgetformatnamelookup.java | Nov. 16, 2003 | 8722 |
| cmdgetgenrelookup.java | Nov. 16, 2003 | 15544 |
| cmdgetgenrenamelookup.java | Nov. 16, 2003 | 8520 |
| cmdgetratinglookup.java | Nov. 16, 2003 | 18066 |
| cmdgetratingsystemlookup.java | Nov. 16, 2003 | 15652 |
| cmdgettitledetails.java | Feb. 26, 2004 | 14730 |
| cmdgettitlelist.java | Feb. 26, 2004 | 21641 |
| cmdgettitletypelookup.java | Nov. 16, 2003 | 15598 |
| cmdaettitletypenamelookup.java | Nov. 16, 2003 | 8857 |
| cmdtrailerplaylist.java | Jan. 7, 2004 | 4945 |
| disc.java | Nov. 16, 2003 | 8892 |
| discapp.java | Feb. 26, 2004 | 35064 |
| discindex.java | Feb. 26, 2004 | 4335 |
| discindexitem.java | Feb. 26, 2004 | 10380 |
| genreitem.java | Jun. 4, 2003 | 1262 |
| inventory.java | Mar. 4, 2004 | 94014 |
| inventoryexception.java | Jul. 2, 2003 | 941 |
| localeindex.java | Jul. 14, 2003 | 1177 |
| localeindexitem.java | Jul. 14, 2003 | 1135 |
| paymentcardtypeindex.java | Aug. 5, 2003 | 1632 |
| paymentcardtypeindexitem.java | Aug. 5, 2003 | 2081 |
| playlist.java | Nov. 16, 2003 | 1153 |
| playlistitem.java | Feb. 26, 2004 | 3968 |
| pricingitem.java | Feb. 26, 2004 | 5993 |
| slotindex.java | Mar. 4, 2004 | 3519 |
| sorttitlediscindex.java | Sep. 29, 2003 | 3648 |
| sorttitlediscindexitem.java | Jul. 14, 2003 | 3182 |
| streetdatediscindex.java | Sep. 29, 2003 | 3672 |
| streetdatediscindexitem.java | Jul. 14, 2003 | 3401 |
| title.java | Feb. 26, 2004 | 13961 |
| titleindex.java | Nov. 16, 2003 | 2394 |
| titleindexitem.java | Jun. 4, 2003 | 663 |
| titletypeindex.java | Jul. 14, 2003 | 1464 |
| titletypeindexitem.java | Feb. 26, 2004 | 2158 |
| dvdplayformatter.java | Oct. 10, 2003 | 2476 |
| dvdplaylevel.java | Jul. 29, 2003 | 619 |
| lckfilefilter.java | Aug. 1, 2003 | 557 |
| log.java | Feb. 26, 2004 | 20142 |
| logfile.java | Nov. 16, 2003 | 3069 |
| playlistmanager.java | Feb. 26, 2004 | 9086 |
| trigger.java | Feb. 26, 2004 | 634 |
| accountmanagertablemodel.java | Jun. 20, 2003 | 2976 |
| aemcontent.java | Feb. 26, 2004 | 8940 |
| badslotstablemodel.java | Nov. 16, 2003 | 3257 |
| barcodehash.java | Jul. 30, 2003 | 453 |
| buttonstatushash.java | Jul. 30, 2003 | 421 |
| discinventorytablemodel.java | Nov. 16, 2003 | 3571 |
| error.java | Aug. 6, 2003 | 2131 |
| help.java | Feb. 26, 2004 | 3840 |
| popupyesno.java | Jul. 30, 2003 | 383 |
| slotcaltablemodel.java | Mar. 3, 2004 | 2894 |
| sortingcolumnmodel.java | Nov. 16, 2003 | 9953 |
| tablemap.java | Aug. 6, 2003 | 2078 |
| testconnectionhash.java | Jul. 30, 2003 | 251 |
| cmdgetcompanygroupdetails.java | Feb. 26, 2004 | 16756 |
| cmdgetcompanygrouplist.java | Feb. 26, 2004 | 16718 |
| cmdgetmarketing.java | Dec. 31, 2003 | 950 |
| cmdgetsitetypelookup.java | Nov. 16, 2003 | 16183 |
| franchise.java | Feb. 26, 2004 | 17918 |
| cmdgettransactiondetails.java | Feb. 26, 2004 | 17436 |
| cmdgettransactionlist.java | Feb. 26, 2004 | 19933 |
| creditcard.java | Nov. 16, 2003 | 7889 |
| emailuser.java | Jun. 15, 2003 | 4995 |
| itransaction.java | Feb. 26, 2004 | 565 |
| lineitem.java | Feb. 26, 2004 | 54831 |
| payment.java | Nov. 16, 2003 | 33845 |
| paymentcard.java | Feb. 26, 2004 | 30972 |
| paymentcardfactory.java | Nov. 16, 2003 | 11065 |
| paymentexception.java | Jun. 30, 2003 | 929 |
| paymentprocesson.java | Nov. 16, 2003 | 4331 |
| processorfactory.java | Nov. 16, 2003 | 1126 |
| receipt.java | Feb. 26, 2004 | 9970 |
| receiptdata.java | Jun. 15, 2003 | 1027 |
| receiptfactory.java | Feb. 26, 2004 | 17784 |
| receiptlineitem.java | Jun. 15, 2003 | 795 |
| receiptrules.java | Feb. 26, 2004 | 13135 |
| refundtransaction.java | Feb. 26, 2004 | 11340 |
| regulartransaction.java | Feb. 26, 2004 | 18307 |
| renewaltransaction.java | Feb. 26, 2004 | 28121 |
| transaction.java | Feb. 26, 2004 | 24278 |
| transactiondetailsbean.java | Jun. 15, 2003 | 343 |
| transactionfactory.java | Nov. 16, 2003 | 2671 |
| verisignexception.java | Jul. 2, 2003 | 932 |
| verisignprocessor.java | Nov. 16, 2003 | 11697 |
| verisignrules.java | Jun. 15, 2003 | 5507 |
| verisigntransactionbean.java | Jun. 15, 2003 | 3867 |
| cmdgetpricemodellookup.java | Feb. 26, 2004 | 16159 |
| cmdgetpriceoptionlookup.java | Feb. 26, 2004 | 17304 |
| cmdgetpricing.java | Feb. 26, 2004 | 43074 |
| regularpricing.java | Sep. 8, 2003 | 2305 |
| specialpricing.java | Sep. 8, 2003 | 2552 |
| cmdgetpromlist.java | Feb. 26, 2004 | 14242 |
| factorypromo.java | Feb. 26, 2004 | 25522 |
| factorypromoreusable.java | Feb. 26, 2004 | 3872 |
| factoryuseoncepercardpromo.java | Feb. 26, 2004 | 4065 |
| factoryuseoncepromo.java | Feb. 26, 2004 | 4866 |
| ipromo.java | Feb. 26, 2004 | 2066 |
| ipromolookuptypes.java | Sep. 24, 2003 | 1511 |
| promo.java | Feb. 26, 2004 | 15338 |
| promocode.java | Jun. 15, 2003 | 3230 |
| promocodelist.java | Jun. 15, 2003 | 262 |
| promocollection.java | Feb. 26, 2004 | 1119 |
| promoexception.java | Jul. 7, 2003 | 1250 |
| promohistory.java | Jul. 7, 2003 | 2129 |
| promoreusable.java | Aug. 4, 2003 | 3911 |
| promostatuses.java | Jun. 15, 2003 | 356 |
| promostorage.java | Nov. 16, 2003 | 1474 |
| promotypes.java | Jun. 15, 2003 | 341 |
| promousagecount.java | Jul. 7, 2003 | 592 |
| promouse.java | Jun. 15, 2003 | 1385 |
| promouseonce.java | Feb. 26, 2004 | 6383 |
| promouseoncepercard.java | Aug. 4, 2003 | 5013 |
| asynchrequest.java | May 30, 2003 | 2620 |
| datarecordrequest.java | May 30, 2003 | 2149 |
| datasetrequest.java | May 30, 2003 | 5800 |
| getfragmentrequest.java | May 30, 2003 | 4622 |
| getplcrecordrequest.java | May 30, 2003 | 4738 |
| getrecordrequest.java | May 30, 2003 | 2275 |
| irequest.java | Jul. 2, 2003 | 922 |
| pingrequest.java | Nov. 16, 2003 | 3534 |
| queryrequest.java | May 30, 2003 | 2287 |
| request.java | Nov. 16, 2003 | 8625 |
| requestfactory.java | Nov. 16, 2003 | 4383 |
| requestlogger.java | Oct. 8, 2003 | 1992 |
| synchrequest.java | May 30, 2003 | 2623 |
| fragments.java | Nov. 16, 2003 | 2519 |
| requestcontext.java | Jun. 27, 2003 | 1266 |
| requestcontroller.java | Feb. 26, 2004 | 18096 |
| aboutcompanyscreen.java | Feb. 26, 2004 | 6274 |
| accountmanagerpanel.java | Nov. 16, 2003 | 9183 |
| aemstartuperrorscreen.java | Feb. 26, 2004 | 3218 |
| applicationinitializing.java | Oct. 15, 2003 | 1471 |
| authorizingpaymentscreen.java | Feb. 26, 2004 | 5290 |
| badslotspanel.java | Nov. 16, 2003 | 4288 |
| barcampegtestpanel.java | Feb. 27, 2004 | 8513 |
| cardreaderhidpanel.java | Nov. 16, 2003 | 3210 |
| carttablescreen.java | Feb. 26, 2004 | 18426 |
| controllerpanel.java | Feb. 27, 2004 | 270 |
| controllerpanelex.java | Feb. 23, 2004 | 26290 |
| controllerpanelfactory.java | Mar. 29, 2004 | 921 |
| controllerpanelplus.java | Mar. 1, 2004 | 268 |
| cycletestpanel.java | Nov. 16, 2003 | 5178 |
| deliveringdvdscreen.java | Feb. 26, 2004 | 8591 |
| discnotbelongscreen.java | Feb. 26, 2004 | 4144 |
| dvddescriptionscreen.java | Feb. 26, 2004 | 29758 |

TABLE A-continued

| FILENAME | DATE | SIZE |
|---|---|---|
| emailscreen.java | Feb. 26, 2004 | 8103 |
| errorlogpanel.java | Nov. 16, 2003 | 1102 |
| errorscreen.java | Feb. 26, 2004 | 13401 |
| gamedescriptionscreen.java | Feb. 26, 2004 | 24581 |
| gameselectionscreen.java | Nov. 16, 2003 | 27734 |
| helpanswerscreen.java | Feb. 26, 2004 | 16534 |
| helpmainscreen.java | Feb. 26, 2004 | 11272 |
| identifyingmoviescreen.java | Feb. 26, 2004 | 5071 |
| initializingaemscreen.java | Feb. 26, 2004 | 3766 |
| inventorycheckpanel.java | Nov. 16, 2003 | 2251 |
| loginpanel.java | Feb. 26, 2004 | 5249 |
| mainscreen.java | Mar. 30, 2004 | 15635 |
| maximumdiscexceededscreen.java | Jan. 22, 2004 | 16350 |
| movieselectionscreen.java | Feb. 26, 2004 | 28745 |
| mustbel8screen.java | Feb. 26, 2004 | 7475 |
| operatorpanel.java | Nov. 16, 2003 | 7544 |
| outoforderscreen.java | Dec. 30, 2003 | 7255 |
| paymentcardapprovedscreen.java | Feb. 26, 2004 | 8836 |
| promocodedescriptionscreen.java | Feb. 26, 2004 | 6761 |
| promocodescreen.java | Feb. 26, 2004 | 12698 |
| pushingdiscallthewayscreen.java | Feb. 26, 2004 | 4632 |
| removediscspanel.java | Nov. 16, 2003 | 6089 |
| removedvdscreen.java | Feb. 26, 2004 | 5700 |
| rentalagreementscreen.java | Feb. 26, 2004 | 15895 |
| returnerrorscreen.java | Feb. 26, 2004 | 4932 |
| returningmoviescreen.java | Feb. 26, 2004 | 4971 |
| returnmoviescreen.java | Feb. 26, 2004 | 5845 |
| returnthankyouscreen.java | Apr. 7, 2004 | 15583 |
| servoparamspanel.java | Mar. 1, 2004 | 268 |
| servoparamspanelex.java | Mar. 1, 2004 | 14613 |
| servoparamspanelfactory.java | Mar. 29, 2004 | 926 |
| servoparamspanelplus.java | Mar. 1, 2004 | 223 |
| simpleremovediscspanel.java | Feb. 26, 2004 | 6620 |
| slotcalpanel.java | Mar. 1, 2004 | 264 |
| slotcalpanelex.java | Mar. 3, 2004 | 10092 |
| slotcalpanelfactory.java | Mar. 29, 2004 | 902 |
| slotcalpanelplus.java | Mar. 1, 2004 | 265 |
| swipepaymentcardscreen.java | Feb. 26, 2004 | 11557 |
| timeoutscreen.java | Feb. 26, 2004 | 9421 |
| unabletorecognizemoviescreen.java | Feb. 26, 2004 | 9386 |
| zipcodescreen.java | Feb. 26, 2004 | 8510 |
| email.java | Feb. 26, 2004 | 8478 |
| heartbeatmonitor.java | Feb. 26, 2004 | 24765 |
| heartbeatthread.java | Apr. 6, 2004 | 3675 |
| iemail.java | Feb. 26, 2004 | 915 |
| ievent.java | Jun. 25, 2003 | 265 |
| missingpostersthread.java | Nov. 16, 2003 | 7848 |
| missingtrailersthread.java | Feb. 26, 2004 | 11914 |
| queue.java | Feb. 26, 2004 | 8012 |
| queueexception.java | Jun. 4, 2003 | 357 |
| queuejob.java | Feb. 26, 2004 | 5743 |
| queuethread.java | Nov. 16, 2003 | 572 |
| sendlogthread.java | Aug. 19, 2003 | 1400 |
| servercommandthread.java | Apr. 6, 2004 | 8271 |
| shutdownthread.java | Nov. 16, 2003 | 1276 |
| taskexception.java | Aug. 18, 2003 | 911 |
| dbaddtitles.java | Oct. 10, 2003 | 8535 |
| dbconnection.java | Feb. 26, 2004 | 1433 |
| dbinterbasemigration.java | Oct. 6, 2003 | 6613 |
| dblegacytitles.java | Oct. 10, 2003 | 6745 |
| dbmediaplaylist.java | Oct. 31, 2003 | 5890 |
| dbservercommand.java | Oct. 31, 2003 | 3927 |
| dbstaticplaylist.java | Oct. 31, 2003 | 5079 |
| dbunicodeaddtitles.java | Nov. 16, 2003 | 16407 |
| dbupdate.java | Jun. 27, 2003 | 5252 |
| dbupdatemfg.java | Sep. 12, 2003 | 15148 |
| garbagecollect.java | Nov. 16, 2003 | 2238 |
| monitorserver.java | Feb. 26, 2004 | 4035 |
| monitorserverthread.java | Nov. 21, 2003 | 4870 |
| sendaemdata.java | Sep. 4, 2003 | 3558 |
| sendpersistencedata.java | Sep. 4, 2003 | 2399 |
| updatechecksum.java | Sep. 4, 2003 | 3088 |
| screenproperties.java | Feb. 26, 2004 | 12070 |
| texttorows.java | Nov. 16, 2003 | 1818 |
| cmdgetcustomerdetails.java | Feb. 26, 2004 | 3596 |
| cmdgetcustomerhistory.java | Nov. 16, 2003 | 11932 |
| cmdgetcustomerlist.java | Feb. 26, 2004 | 11182 |
| customerdetailsbean.java | Jun. 15, 2003 | 337 |
| user.java | Jun. 15, 2003 | 5411 |
| useractions.java | Nov. 16, 2003 | 5003 |
| userstorage.java | Nov. 16, 2003 | 5957 |
| discaction.java | Mar. 4, 2004 | 3510 |
| discactionexception.java | Jun. 4, 2003 | 378 |
| discfound.java | Nov. 16, 2003 | 6380 |
| discitem.java | Jun. 4, 2003 | 528 |
| discmissing.java | Nov. 16, 2003 | 4576 |
| discremove.java | Nov. 16, 2003 | 5859 |
| discrental.java | Nov. 16, 2003 | 17957 |
| discrentalexception.java | Jun. 4, 2003 | 378 |
| discreturn.java | Nov. 16, 2003 | 9215 |
| groupcodeexception.java | Jul. 14, 2003 | 326 |
| maxdiscsallowedexception.java | Jun. 25, 2003 | 436 |
| nodiscinslotexception.java | Aug. 5, 2003 | 377 |
| processpaymentvalidationexception.java | Aug. 5, 2003 | 398 |
| promocodeexception.java | Aug. 5, 2003 | 368 |
| removeop.java | Apr. 9, 2004 | 3512 |
| removeopexception.java | Jun. 4, 2003 | 374 |
| rentop.java | Apr. 9, 2004 | 16824 |
| rentopexception.java | Jul. 2, 2003 | 461 |
| returnop.java | Mar. 25, 2004 | 7030 |
| returnopexception.java | Jun. 4, 2003 | 375 |
| environment.java | Nov. 16, 2003 | 4885 |
| execcommandline.java | Feb. 26, 2004 | 3979 |
| formatutil.java | Jun. 15, 2003 | 8269 |
| formatutility.java | Jun. 15, 2003 | 2542 |
| ienvironment.java | Sep. 10, 2003 | 668 |
| lookuptable.java | Jun. 15, 2003 | 566 |
| reportutil.java | Feb. 26, 2004 | 2732 |
| stopwatch.java | Aug. 6, 2003 | 935 |
| util.java | Feb. 26, 2004 | 21009 |
| utility.java | Jun. 15, 2003 | 19615 |
| bottombarmodel.java | Feb. 26, 2004 | 16129 |
| curvedborder.java | Jun. 4, 2003 | 1148 |
| keyboardassembler.java | Feb. 26, 2004 | 6959 |
| tablerenderer.java | Jun. 4, 2003 | 812 |
| topbarmodel.java | Feb. 26, 2004 | 6515 |
| utility.java | Nov. 16, 2003 | 2243 |
| addtitles.bat | Nov. 3, 2003 | 562 |
| aemapp.bat | Oct. 16, 2003 | 553 |
| aemboot.bat | Oct. 13, 2003 | 313 |
| aemclosed.bat | Jan. 27, 2004 | 152 |
| aemcreate.bat | Oct. 8, 2003 | 549 |
| aemdisplayoff.bat | Apr. 19, 2004 | 61 |
| aemdisplayon.bat | Apr. 19, 2004 | 60 |
| aeminst.bat | Aug. 7, 2003 | 366 |
| aemmigrate.bat | Oct. 8, 2003 | 541 |
| aemship.bat | Oct. 13, 2003 | 413 |
| aemstandalone.bat | Oct. 8, 2003 | 419 |
| aemstartapp.bat | Oct. 16, 2003 | 400 |
| aemstartapp.vbs | Mar. 5, 2004 | 1601 |
| aemtools.bat | Oct. 8, 2003 | 468 |
| 0overdue.txt | Feb. 5, 2004 | 155 |
| 0promonotify.txt | Feb. 5, 2004 | 108 |
| 0refund.txt | Feb. 5, 2004 | 99 |
| 0rental.txt | Feb. 5, 2004 | 108 |
| alert.content.txt | Feb. 26, 2004 | 143 |

BACKGROUND

1. Field of the Invention

This invention relates to a system for an automated dispensing and retrieval kiosk for recorded media such as DVDs. More particularly, this invention relates to an apparatus for providing an automated, freestanding dispensing and retrieval system for automated retail distribution of recorded media, which is linked to a central server computer using the Internet.

2. Description of the Related Art

Retail outlets are commonplace hubs for sale or rental of recorded media. These outlets typically have a substantial inventory of optical media, and therefore require a building to house the inventory and provide a location for commerce. In addition, staff is required for sale and/or rental of recorded media, processing of returned media and restocking of returned or new media. These requirements result in considerable overhead to a person or company seeking to run a business that trades in recorded media—for example, wages and rent must be paid regularly.

Some wishing to cash in on the recorded media trade have sought to reduce the aforementioned overhead by offering a limited supply of recorded media at an existing establishment, such as a convenience store. However, as staff is still required for sales, rentals and restocking, others have attempted to reduce overhead associated with the trade of recorded media through electronic commerce (EC). In this type of business model, a customer submits an order for recorded media via the Internet. A central warehouse then ships the ordered media through the mail, or using a private courier. The cost of operating a retail location is avoided with this business model. However, Internet-based distribution systems often have significant liabilities.

One such liability is that a customer must wait for an order to be shipped from a warehouse location. Another disadvantage is that stock may not be available at the time the order is processed. If stock is unavailable, an order may be placed on back-order until the requested recorded media is available, at which time the customer may no longer be interested in the requested media. Alternately, the order may be canceled. Another significant disadvantage of an Internet-based distribution system is the impracticality for media rental. The rental business is one of immediacy; a customer will rent an item that is available immediately, but may not rent if it is not available immediately. A customer is much less likely to rent an item that is shipped after ordering, requiring days for delivery. In addition, once a customer is finished with a rented item, that customer must deal with the inconvenience of return-shipping the media to the distribution location.

SUMMARY

There is need for a system for automated dispensing and retrieval of recorded media that takes advantage of the benefits of Internet-based distribution (such as creation of customer accounts, electronic payment and accrual of valuable customer information) while eliminating the aforementioned disadvantages (such as an extended waiting period to view an ordered media after rental and the requirement for return-shipping the media). There is also a need for a system for automated dispensing and retrieval of recorded media that eliminates the need for a retail outlet, attendant staff and associated expenses.

In one embodiment, a system for an automated dispensing and retrieval kiosk for recorded media includes a plurality of vertical racks in a circular formation, each rack configured for storing a plurality of recorded media. A customer interface allows a customer to select or return a recorded media. A robotic element delivers the selected recorded media from the vertical racks to a media output, at the customer interface. The element also delivers a returned recorded media from a media input at the customer interface to the vertical racks. A computer controls operation of the kiosk, and an Internet interface connects the kiosk to the Internet.

In one embodiment, a system for an automated dispensing and retrieval kiosk for recorded media includes a kiosk body; a storage subsystem within the body, for storing a plurality of recorded media; a presentation device supported in association with the body for presenting information to a customer; a customer interface for interacting with the customer in a transaction for a recorded media; a computer for controlling operation of the kiosk; and a telecommunication subsystem for remote administration and billing interface with the computer. Program logic configured for interaction with the presentation device, facilitates selection and presentation of a particular category from the recorded media to consumers, according to predetermined selection criteria.

In one embodiment, an improvement in a kiosk used for dispensing and retrieval of recorded media includes a telecommunications system for exchanging data between a central administrator and the kiosk. The kiosk has electronic controls, responsive to instructions from the central administrator, for governing administration of the kiosk according to a selected one of a plurality of states. The include a first state which provides for automatic administration of the kiosk; and a second state which provides for remote administration of the kiosk via the telecommunications system, according to the instructions from the central administrator. The first state is governed by program instructions providing for one or more of: selecting a mix of recorded media for the kiosk inventory; converting a recorded media from rentable to saleable; performing software upgrades from one or more remote locations; performing analysis of the kiosk; predicting maintenance of the kiosk; determining an alarm condition; generating an alarm in response to the alarm condition; and performing maintenance of the kiosk

BRIEF DESCRIPTION OF THE FIGURES

FIG. 2 is a perspective view of the kiosk of FIG. 1B, with the front door removed to show internal kiosk components.

FIG. 5A is a front perspective view of the horseshoe construct and storage assembly of FIG. 3.

FIG. 5B is a front perspective view of the horseshoe construct and robotic element of FIG. 3

FIG. 5C is a front perspective view of the horseshoe construct and input/output module of FIG. 3

FIG. 6A-6C are perspective views of the robotic element of FIG. 5B, with a gripping assembly for gripping and moving recorded media within a kiosk.

FIG. 7A is a side perspective view of the gripping assembly of FIGS. 6A-6C.

FIG. 7B is an alternate side perspective view of the gripping assembly of FIG. 7A.

FIG. 8A is a front perspective view of the input/output module of FIG. 3.

FIG. 8B is a rear perspective view of the input/output module of FIG. 8A.

DETAILED DESCRIPTION

Systems and methods now disclosed illustrate networked, automated kiosks that not only automatically perform physical dispensing and retrieval of recorded media, but that also collect data from transactions and other events and then report said data to a central database. This aggregation of information provides for remote tracking and analysis of data using a variety of metrics such as transaction time, transaction volume, customer information, inventory levels, etc. Reports of the aforementioned are for example generated according to the report framework summarized in Appendix K, and in accordance with exemplary software architecture outlined in Appendix L.

Figure 1:
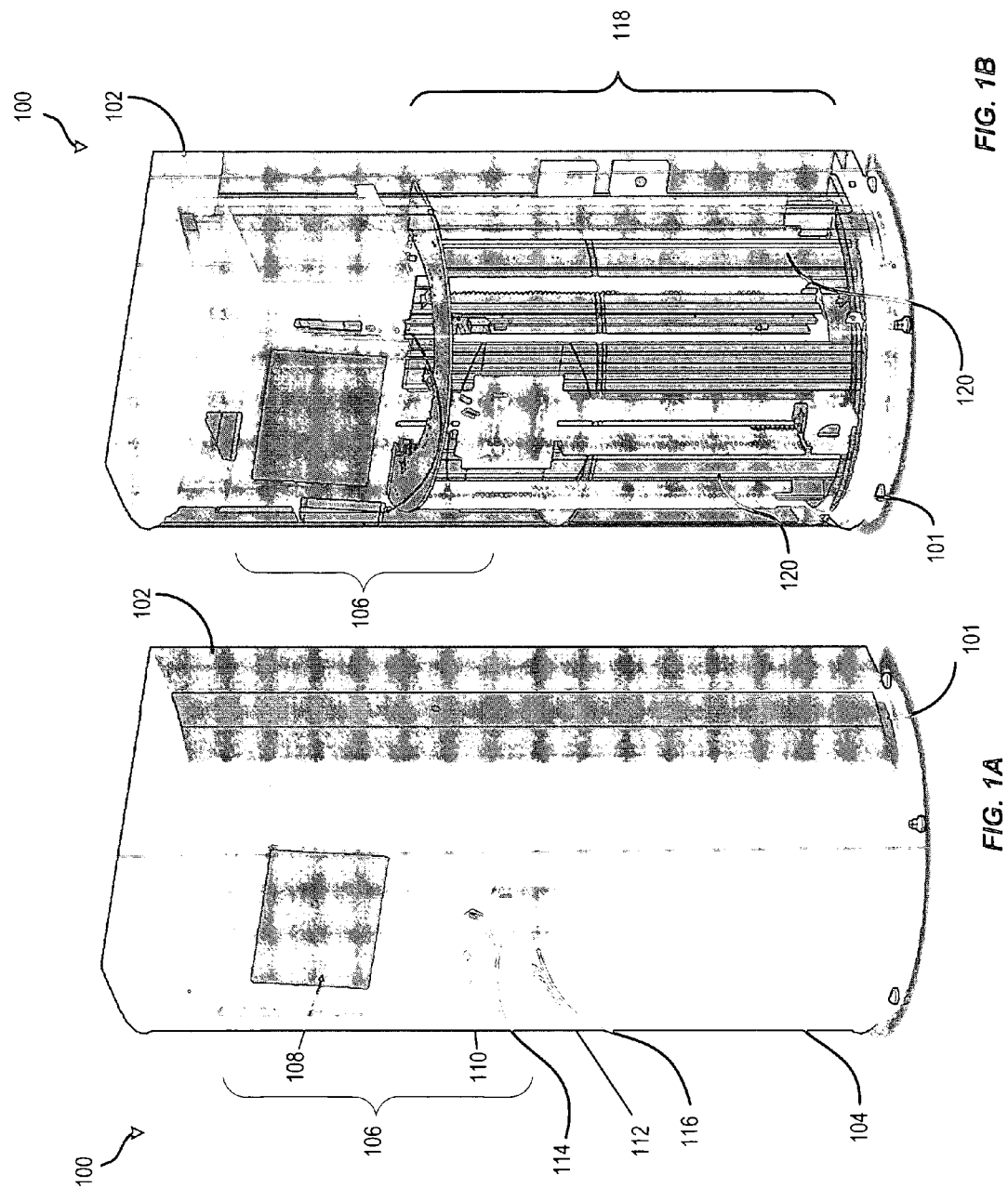
FIG. 1A is a perspective view showing a system for an automated dispensing and retrieval kiosk for recorded media, in accordance with one embodiment.
FIG. 1B is a perspective view of the kiosk of FIG. 1A, with a transparent front door.

FIG. 1A shows a schematic perspective view of one embodiment of a system for an automated dispensing and retrieval kiosk for recorded media. System 100 includes a kiosk 101, having a kiosk body 102 that is for example shaped as a half cylinder with a front panel or door 104. A customer interface assembly 106 is for example mounted with door 104 and includes a customer interface 108, a card reader 110 for reading information from a card such as a credit or debit card, and an input/output module 112. As shown, customer interface 108 may be a liquid crystal display ("LCD") touch screen 108; however, customer interface 108 may alternately be a combined display screen and keyboard and/or voice recognition device. Input/output module 112 includes a media input 114 for receiving recorded media into kiosk 101, and a media output 116, for dispensing recorded media from kiosk 101. Media input and output 114, 116 are for example slots which may include one-way doors or other covers.

FIG. 1B shows a schematic perspective view of kiosk 101 with a transparent door 104, for illustration of internal kiosk components. A storage subsystem such as horseshoe construct 118, has a plurality of vertical racks 120 suitable for storing a plurality of recorded media, such as DVDs. Horseshoe construct 118 is illustratively shown as a semi-circle, but may also be formed as a complete circle, or any part thereof. As used herein, "circular formation" refers to any formation along a complete circle, or any portion thereof. Racks 120 are arranged in said circular formation, and their size and number is selectable, for example according to the total number of media to be stored therein and/or the shape of horseshoe construct 118. Arranging vertical racks 120 in a circular formation may increase the packing density of recorded media within the kiosk FIG. 2 shows a perspective view of system 100 with front door 104 of kiosk 101 removed, to further illustrate kiosk internal components. As shown, vertical racks 120 are for example mounted in a semi-circle within horseshoe construct 118 and are thereby proximate to a central robotic element 122. Recorded media storage capacity of kiosk 101 is based upon a number and a vertical size of vertical racks 120. Specifically, the number and the size of vertical racks 120 may be selected based upon required storage capacity of kiosk 101. Use of vertical racks 120 and horseshoe construct 118 may provide enhanced storage of recorded media within kiosk 101, as compared to 'carousel type' storage units, thereby increasing storage density of recorded media within kiosk 101.

As also shown in FIG. 2, kiosk 101 includes an internal computer 124 and power supply unit 126. Computer (also referred to as computer module) 124 includes at least a processing unit, volatile memory, storage unit and a telecommunication subsystem/communication interface for remote administration and billing interface with computer module 124. Computer module 124 is for example a Windows XP based personal computer configured for operation within kiosk 101. Power supply unit 126 may include an uninterruptible power supply ("UPS") unit, for example having a battery, to provide power to kiosk 101 in the event that an external power supply is interrupted. Power supply unit 126 may also include other electronic components such as motion control electronics to operate robotic element 122.

Figure 4:
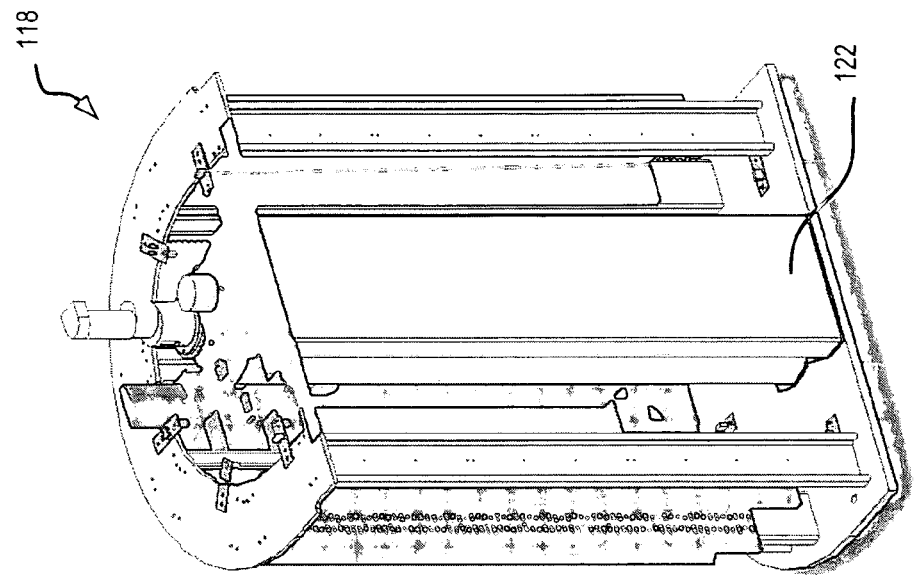
FIG. 4 is a rear perspective view of the horseshoe construct of FIG. 3.
Figure 3:
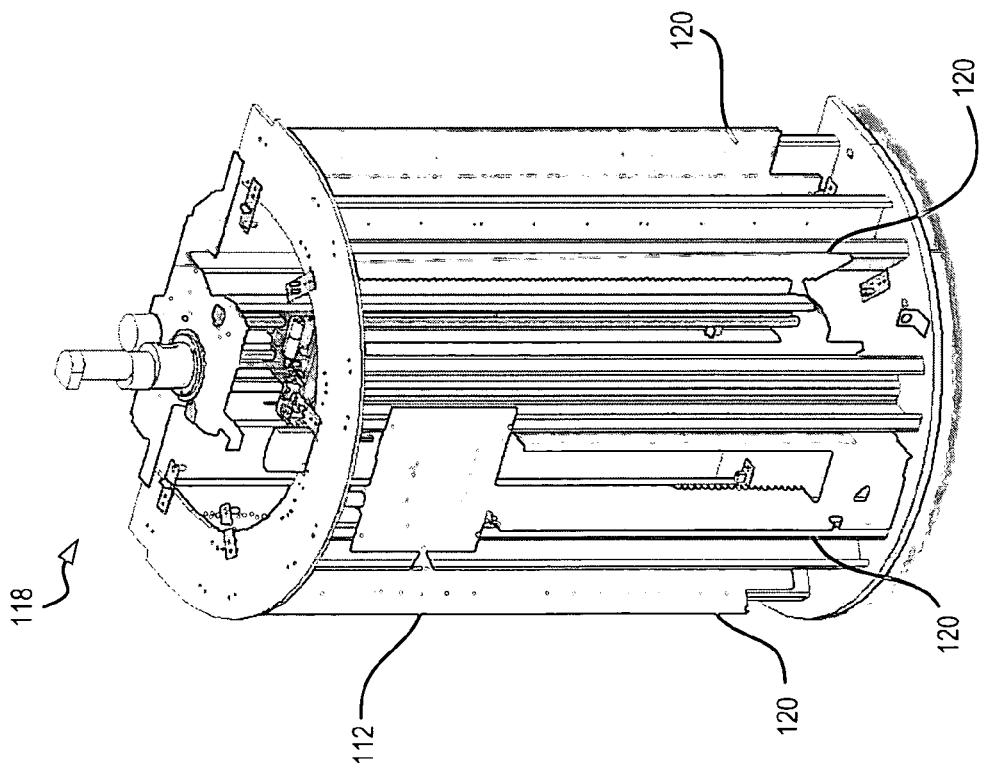
FIG. 3 is a front perspective view of a horseshoe construct within the kiosk of FIG. 1, including a storage assembly for recorded media, a robotic element and an input/output module.

FIGS. 3, 4 and 5A-5C show perspective views of horseshoe construct 118. As shown in FIGS. 3 and 4, vertical racks 120 are for example spaced along the curved portion of horseshoe construct 118, with robotic element 122 positioned equidistant from the horseshoe ends; however, alternate numbers and positions of racks 120 and alternate positioning of robotic element 122 may be employed, as a matter of design choice.

FIGS. 5A-C emphasize particular elements of horseshoe construct 118. For clarity, features of FIGS. 5A-C that are not specifically discussed herein below are depicted with dotted lines, with the emphasized features shown in solid lines. For example, as shown in FIG. 5A, each rack 120 is arranged as a vertical tower including a plurality of stacked shelves 128 for holding recorded media, and racks 120 partially surround robotic element 122. In one embodiment, each item of recorded media is enclosed in a media case configured for handling by robotic element 112. The media case for example includes one or more grip-enhancing features such as indentations or extrusions shaped to fit, respectively, corresponding extrusions or indentations of a y-axis gripping assembly 130 (FIG. 5B) of the robotic element 122. Grip-enhancing features may additionally or optionally include a textured area and/or a strip or patch of easy-grip material such as sticky rubber, to facilitate gripping by gripping assembly 130.

FIG. 5B shows y-axis gripping assembly 130, which for example utilizes the aforementioned specific case features to achieve secure gripping, and subsequent movement, of the recorded media within kiosk 101. Gripping assembly 130 is for example mounted with a rotational assembly 132 of robotic element 122 (see also FIG. 6B) for rotating gripping assembly 130 into position with any of the surrounding racks 12. Robotic element 122 for example facilitates movement of a gripped recorded media along the x-, y- and z-axes, as illustrated in coordinate system 500. In other words, as described further with respect to FIGS. 7A, 7B, gripping assembly 130 moves both horizontally and vertically (e.g., back and forth along the y-axis and up and down along the x-axis), in addition to rotating at an angle θ with respect to the y-axis. Upon command by computer module 124, gripping assembly 130 for example rotates via rotational assembly 132 until proximate a shelf 128 associated with a requested media. As shown, input/output module 112 is positioned within the range of rotational movement of gripping assembly 130, for example, opposite robotic element 122 along horseshoe construct 118. Assembly 130, driven by robotic element 122, may therefore retrieve the requested media, pivot (via rotational assembly 132) into alignment with output 116, and deliver the media through output 116. Conversely, upon command and via rotational assembly 132, gripping assembly 130 for example retrieves a returned media from input 114, and delivers the returned media to an associated shelf 128, for storage.

FIGS. 6A, 6B and 6C emphasize particular elements of robotic element 122. In particular, FIG. 6A shows a y-axis drive motor 134, for moving y-axis gripping assembly 130 up and down along the y-axis, and a rotational axis drive motor 136, for driving rotational assembly 132 (shown in FIG. 6B). Gripping assembly 130 (FIG. 6C) for example rotates, via motor 136 and rotational assembly 132, to an angle θ with respect to the x-axis, the angle θ corresponding with a particular rack 120. Motor 134 moves gripping assembly 130 up or down, into position with a shelf 128 associated with a requested media. Gripping assembly 130 retrieves the media, rotates along the x-y plane via motor 136 and rotational assembly 132, and raises or lowers along the y-axis via motor 134 into position with output 116, to deliver the requested media. Media output 116 for example includes one or more sensors to verify removal of the media case from output 116.

FIGS. 7A and 7B show perspective views of z-axis gripping assembly 130. Assembly 130 for example includes a media gripper 138, sequenced by a gripper motor 140, such as a camshaft mechanism, to grip and release a media case. In one example of operation, robotic element 122 selects a media case (containing a recorded media) from a shelf 128 of a vertical rack 120. A grip sensor (not shown) for example indicates that the case is securely held by gripper 138, prior to delivery of the recorded media to output 116. In particular, once the case is securely held, a x-axis drive motor 142 moves gripping assembly 130 backward and forward along the x-axis (or back and forth at an angle θ in the x-y plane). Back and forth motion of gripping assembly 130 is for example facilitated by linear bearings 144 (FIG. 7B). Gripping assembly 130 may thus move forward to retrieve a deposited case from input 114, grip the case using gripper 138, and move backwards via x-axis drive motor 142, taking the case with it. The case may then be delivered, through the aforementioned rotational, up and down, and back and forth movements, to an associated shelf 128, for storage. As shown in FIGS. 7A and 7B, up and down movement of gripping assembly 130 along the y-axis may be facilitated by y-axis bearings 146 and a y-axis leadscrew nut 148.

FIGS. 8A and 8B show respective front and back perspective views of input/output module 112 and illustrate input 114 and output 116 in further detail. As shown, an input door solenoid 150 facilitates return of media through input 114.

As previously noted, media cases used with the described automated dispensing and retrieval kiosk may include features for facilitating gripping by gripping assembly 130. Such cases may also incorporate elements for indicating damage or abuse to recorded media within the case. For example, the media case may include a damage indicator for indicating possible damage to the case and/or recorded media contained therein. Kiosk 101, through use of the one or more case sensors 152 located at input 114, for example reads a temperature indicator such as a temperature sensitive coating on a returned media case to determine if the media case (and thus the recorded media therein) has been subjected to extremes of temperature, potentially damaging the recorded media. Case sensors 152 read for example detect a color or compositional change in the aforementioned temperature sensitive coating. Alternately or optionally, case sensors 152 may be temperature sensors, to sense an actual temperature of the case. In one embodiment, if a case sensor 152 determines damage to a media case, a case rejection mechanism in communication with the sensor 152 (for example by internal circuitry), prevents return of the damaged case at media input 114. In one aspect, a subscriber service may be enforced by use of a subscriber case that presents a unique electronically scannable indicia to identify that the case is authorized for use in subscription use or use within a particular kiosk or sub-group of kiosks, etc. A user may present this case for scanning and authorization to proceed with a transaction. The subscriber may have pre-approved billing arrangements.

As also shown in FIGS. 8A and 8B, a kiosk sensor such as camera 154 is for example mounted with kiosk 101, to monitor operation thereof. A still or video camera 154 may image a person engaging with the kiosk, for example in a credit card transaction. FIGS. 8A, 8B show one possible position of camera 154 relative to input/output 112. As shown, camera 154 is mounted within kiosk 101; however, it is to be understood that camera 154 may equally be mounted external to kiosk 101, for example to one side of, or above, touch screen 108. The following Table B identifies screen shots, viewable on touch screen 108, as provided in Appendix M:

TABLE B

| Screen Shots-Appendix M |
|---|
| Version 2 Screen Shots |
| action.jpg |
| addmovie.jpg |
| anime.jpg |
| authorizing.jpg |
| authorizingWithTrivia.jpg |
| cartwpromo.jpg |
| checkout.jpg |
| comedy.jpg |
| delivering.jpg |
| DeliveringDVDBuy.jpg |
| DeliveringDVDRent.jpg |
| deliveringsam.jpg |
| DiscDoesnotBelong.jpg |
| DoYouNeedMoreTime.gif |
| drama.jpg |
| email.jpg |
| family.jpg |
| forei gn.jpg |
| helphowdoi.jpg |
| HelpMaxDVD.jpg |
| helpscreen.jpg |
| helpscreenmore.jpg |
| homejpg |
| horror.jpg |
| identifying.jpg |
| identifyingWithTrivia.jpg |
| InitializingScreen.jpg |
| keyboardzip.jpg |
| MachineFullForReturn.jpg |
| Main.gif |
| Main.jpg |
| mainWithWhiteBackground.jpg |
| MaxDiscExceeded.jpg |
| more.jpg |
| MovieDetail.jpg |
| moviedetailgod.jpg |
| moviedetailpay.jpg |
| moviedetailsam.jpg |
| moviedetailscary.jpg |
| moviedetailtriplets.jpg |
| newrelease.jpg |
| newreleasemore.jpg |
| OpsDiscNotCurrentlyAvailable.jpg |
| OpsExpiredPaymentCard.jpg |
| OpsPaymentCardNotRecognize.jpg |
| OpsPromoNotRecognize.jpg |
| OpsServerCommDifficulties.jpg |
| OpsTitleUnavailble.jpg |
| OpsUnableToProcessRental.jpg |
| OpsUnableToReceive.jpg |
| OpsUnableToVerifyZip.jpg |
| OpsUnableVeri fyPaymentCard.jpg |
| payment.jpg |

TABLE B-continued

Figure 9:
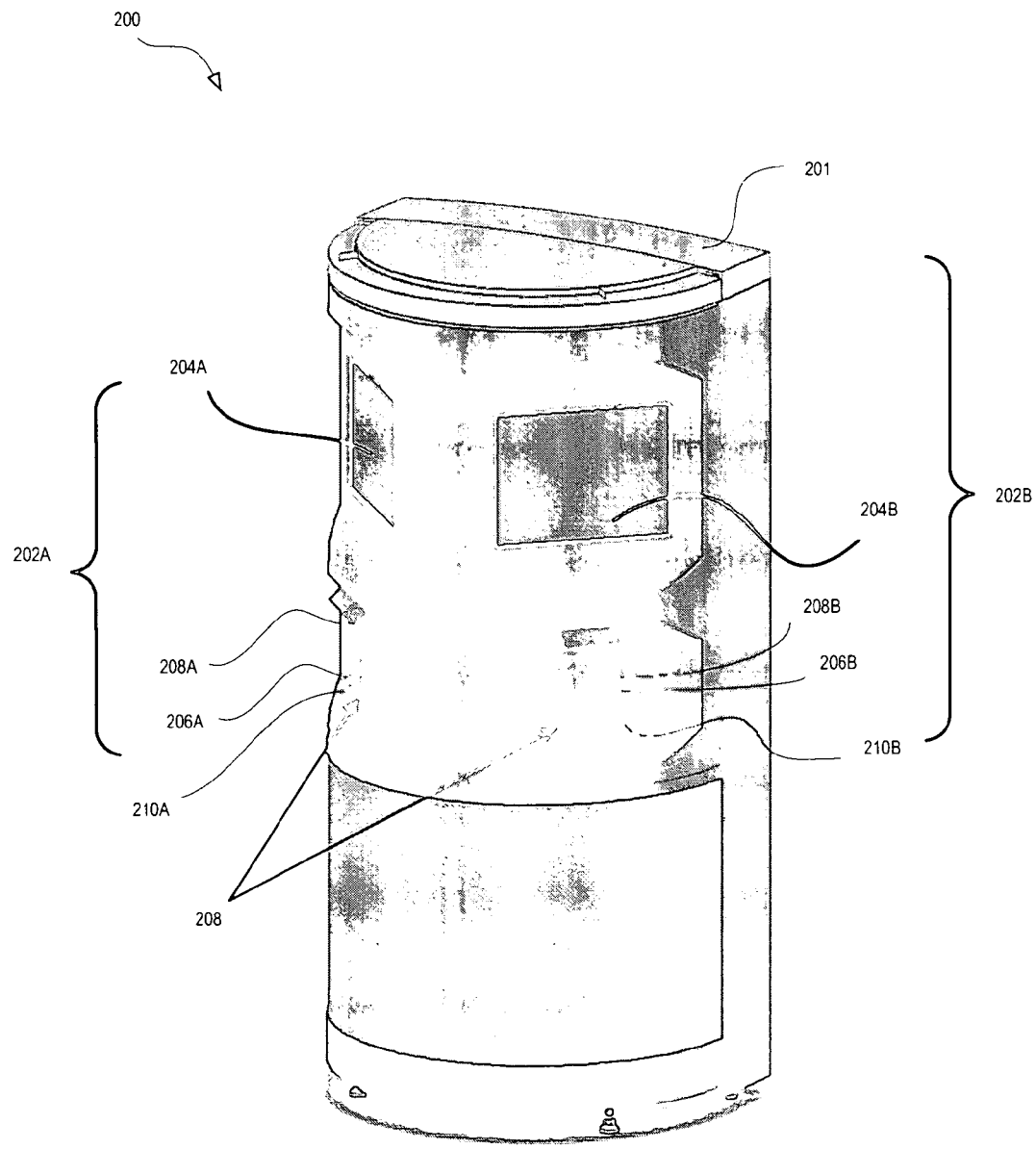
FIG. 9 is a front perspective view of a system for an automated dispensing and retrieval kiosk with two customer interfaces, in accordance with one embodiment.

Screen Shots-Appendix M payment735.jpg
paymentemail.jpg
paymentemail735.jpg
paymentpromo.jpg
promoscreen.jpg
promowhatis.jpg
PushDiscAllTheWay.jpg
QuickPoll1.jpg
QuickPoll2.jpg
quickpolla.jpg
remove.jpg
RentalAgreement.jpg
rentscreen.jpg
rentscreen1disc.jpg
rentscreen2.jpg
return.jpg
return2.jpg
ReturnDVD.jpg
returnWithTrivia.jpg
romance.jpg
S1.jpg
S2.jpg
S3.jpg
S4.jpg
scifi.jpg
selectmovie.jpg
selectmovieadd.jpg
sports.jpg
StartupError.jpg
thankyou.jpg
thankyou735.jpg
thankyoupromo.jpg
thankyoureturn.jpg
thankyoureturnWithTrivia.jpg
thankyouWithTrivia.jpg
Tool_BadSlots.jpg
Tool_BarCamPegTest.jpg
Tool_CardReaderHID.jpg
Tool_Controller.jpg
Tool_CycleTest.jpg
Tool_InventoryCheck.jpg
Tool_Login.jpg
Tool_Operator.jpg
Tool_ServoParams.jpg
toppicks.jpg
UnableToAcceptCreditCard.jpg
UnableToAcceptReturn.jpg
UnableToRecognize.jpg
viewall.jpg
war.jpg
bytes Version 2.5 Screen Shots BuyConfirmationScreen.jpg
CartScreen1.jpg
CartScreen2.jpg
EmailScreen.jpg
MainScreen.jpg
MainScreenTrailer.jpg
MovieDetailScreen1.jpg
MovieDetailScreen2.jpg
MovieSelectionScreen.jpg
PromoCodeDescriptionScreen.jpg
PromoCodeScreen.jpg
RentalAgreementScreen.jpg
RentalSalesAgreementScreen.jpg
ReturnDVD.jpg
ReturnThankYouScreen.jpg
TakeDVD.jpg
Tool_RemoveDiscs.jpg
TransactionTimeOut.jpg
UnableToRecognizeDVD.jpg
ZipCodeScreen.jpg FIG. 9 shows one exemplary system 200 with a kiosk 201 having two customer interfaces 202A and 202B. Customer interfaces 202A, 202B may each be similar to customer interface assembly 106 of FIG. 1A; each including respective customer inputs (e.g., LCD touch screens) 204A, 204B and input/output modules 206A, 206B, each input/output module including a respective input 208A, 208B for receiving recorded media, and an output 210A, 210B, for dispensing recorded media. Card readers 212A, 212B for example read information from credit cards inserted therein. Kiosk 201 may incorporate additional interfaces 202, as a matter of design preference. Likewise, two half-cylindrical kiosks 101 or 201 may be positioned back-to-back to provide a cylindrical kiosk station, for example with multiple interfaces 202 positioned about the circumference of the station.

Figure 10:
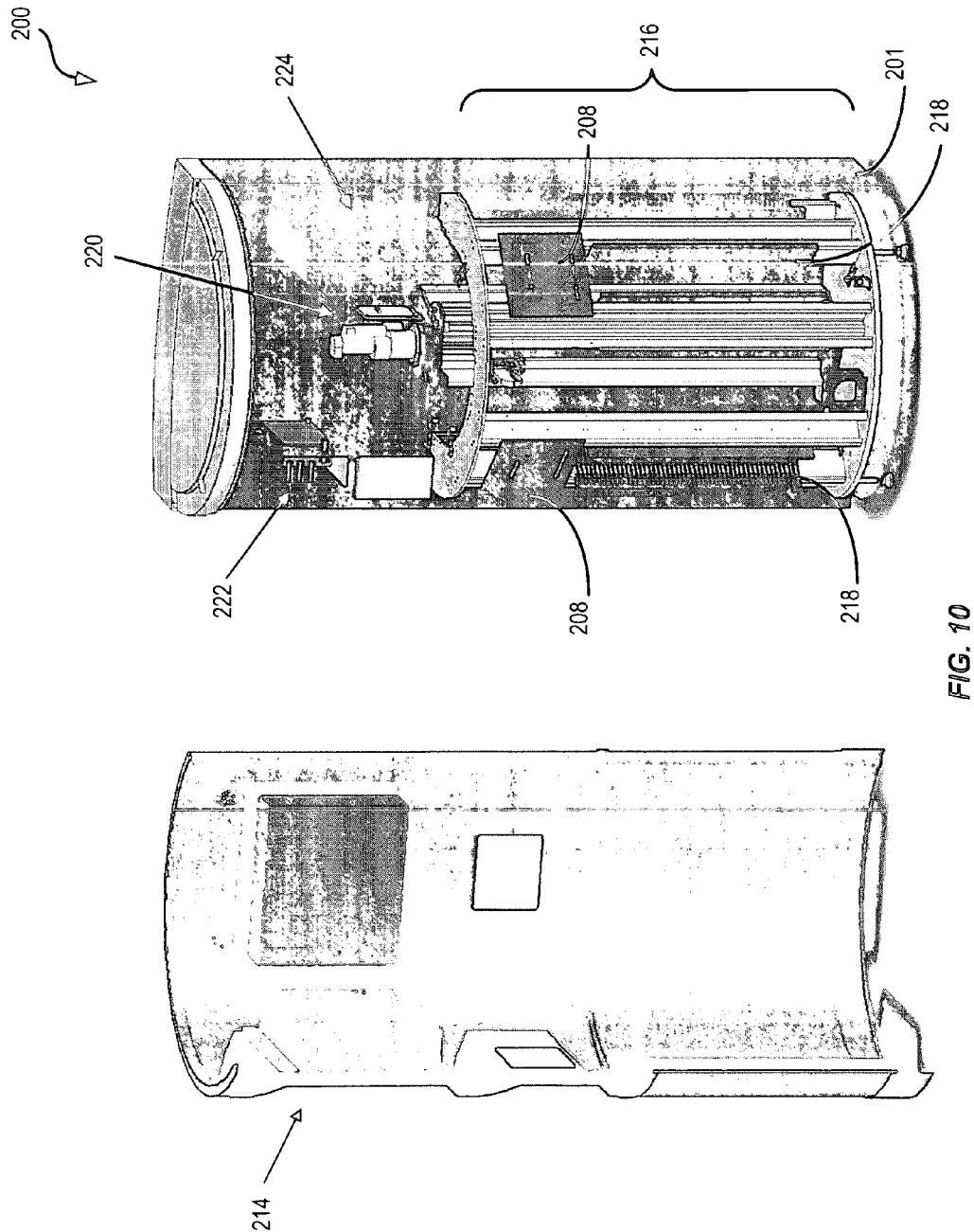
FIG. 10 is a front perspective view of the kiosk of FIG. 9, with a front door removed to show internal kiosk components including a horseshoe construct

FIG. 10 shows one view of kiosk 201 with a front door 214 removed for purposes of illustration. Kiosk 201 includes internal horseshoe construct 216, with a plurality of vertical racks 218 and a robotic element 220 having a y-axis gripping assembly (see FIG. 11). Power supply 222 for example includes a UPS unit for powering kiosk 201 if an external power supply is interrupted. Other electronics, e.g., motion control electronics for operating robotic element 122, may be further included with power supply 222. A computer module 224 for example controls operation of kiosk 201.

Figure 11:
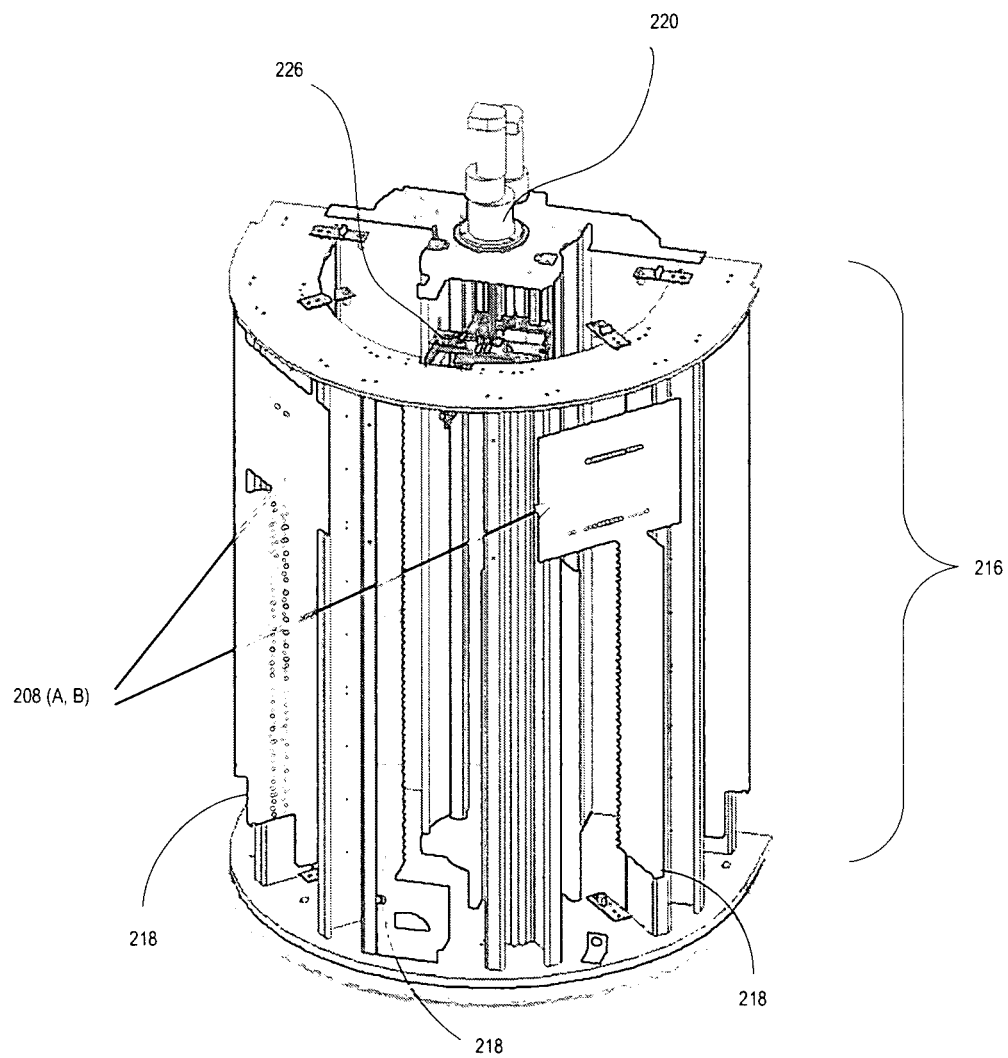
FIG. 11 is a front perspective view showing the horseshoe construct of the kiosk of FIG. 10 in further detail.

FIG. 11 shows horseshoe construct 216, vertical racks 218, robotic element 220 and y-axis gripping assembly 226 in further detail. Horseshow construct 216, vertical racks 218, robotic element 220 and y-axis gripping assembly 226 are for example similar to horseshoe construct 118, vertical racks 120, robotic element 122 and y-axis gripping assembly 130 of FIG. 3. FIGS. 9, 10 and 11 are best viewed together with the following description.

In kiosk 201, robotic element 220 may deliver selected recorded media to one of input/output modules 206(A) or 206(B). For example, if a first customer interacts with customer interface 202(A) and a second customer interacts with customer interface 202(B), robotic element 220, using y-axis gripping assembly 226, delivers a first recorded media, selected by the first customer, to input/output module 206(A) and delivers a second recorded media, selected by the second customer, to input/output module 206(B). Input/output modules 206 may include one or more sensors (e.g., monitor sensors 358, FIG. 13) to determine acceptance of the selected recorded media by customers. Kiosk 201 may contain part or all functionality of kiosk 101, described above.

Systems 100, 200 may include a plurality of kiosks (e.g., one or more of kiosk 101 and/or kiosk 201) co-located and 'grouped' together via a kiosk-to-kiosk telecommunications device such as an Internet interface, or a telecommunications device facilitating interface between a central server and the kiosks. For example, kiosks 101, 201 regularly communicate operating conditions such as functional status, program or operational errors, temperature and other environmental conditions, and CPU and memory load to a central administrator associated with the central server, according to update protocol governed by program instructions included in hardware or software operable with computer 124. Kiosks may likewise communicate with each other and the central server to provide additional inventory capacity at a particular location. For example, multiple kiosks may be provided at a location where inventory of a single kiosk is frequently exhausted, to increase inventory. These grouped kiosks may communicate (e.g., using the Internet, a wireless interface or a wired face) inventory status information directly with one another, enabling recorded media to be located within any kiosk of the group. In another example, each of the grouped kiosks communicates its inventory status to a server (e.g., a server located on the Internet or with central administrator), which may then be interrogated by one or more kiosks to locate stock of recorded media within other kiosks of the group. Program instructions for example provide for listing of access to inventory information within and between kiosks, as exemplified in the Data Caching and Framework information of Appendix A.

In one example of operation, a potential customer requests a certain recorded media from a first kiosk of a group. Where stock of the recorded media has been exhausted from the first kiosk, the first kiosk communicates with other kiosks of the group (e.g., directly or via a server) to locate stock of the recorded media. If the recorded media is stocked by one or more other kiosks of the group, the first kiosk identifies the one or more other kiosks, for example directing the potential customer to the one or more other kiosks via a message displayed upon a touch screen 108, 204A or 204B.

In one embodiment, where a first kiosk is exhausted of a recorded media requested by a customer, the first kiosk may locate and reserve stock of the recorded media within another kiosk of the group. If this reserved recorded media is not claimed within a certain time period, the reservation may be automatically cancelled.

Figure 12:
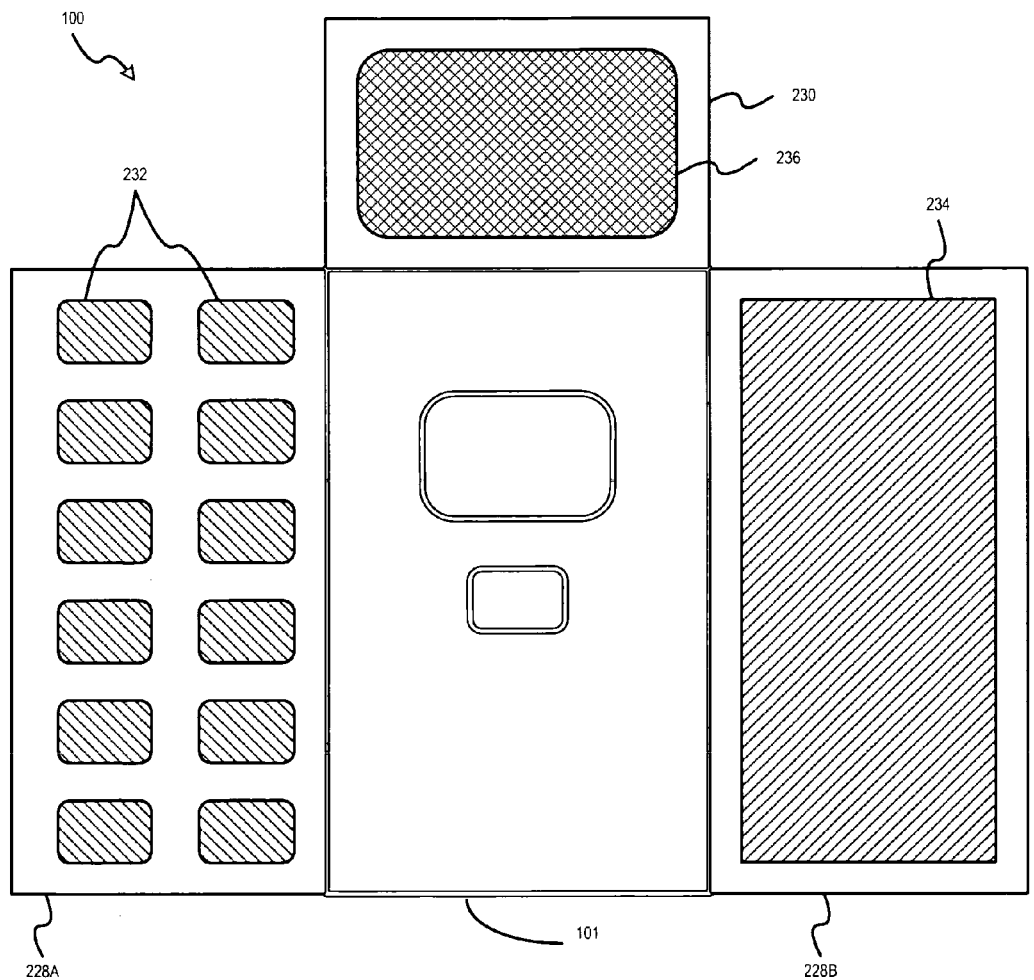
FIG. 12 is a schematic view of the kiosk of FIG. 1A, illustrating exemplary display wings and an exemplary modular display topper.

As shown in FIG. 12, a system for an automated dispensing and retrieval kiosk includes one or more presentation devices that for example serve as marketing display units. FIG. 12 depicts system 100 with kiosk 101 including exemplary display wings 228 and an exemplary display topper 230. As illustrated, display wings 228 and topper 230 are modular presentation devices supported in association with kiosk body 102; however, it will be understood that display wings 228 and/or topper 230 may also be integrated with kiosk 101, as a matter of design preference. Modular display wing 228 (A) is illustratively shown with a plurality of active display panels 232 (e.g., LCDs) that may, for example, display active advertisements (e.g., film trailers) of remaining inventory within kiosk 101, or other information, through control of kiosk 101 (or via the central server connected to kiosk 101). Modular display wing 228(B) is illustratively shown displaying a static advertisement 234 of recorded media within kiosk 101; static advertisement may also display other notices or advertisement information. As shown, modular display topper 230 has a single active display screen 236 (e.g., a cathode ray tube display, a liquid crystal display, a back-lit four color display, etc.) and may include other audio visual equipment, such as lights and speakers. Modular display topper 230 for example displays marketing material (e.g., related to remaining inventory) or other information upon screen 236.

Figure 13:
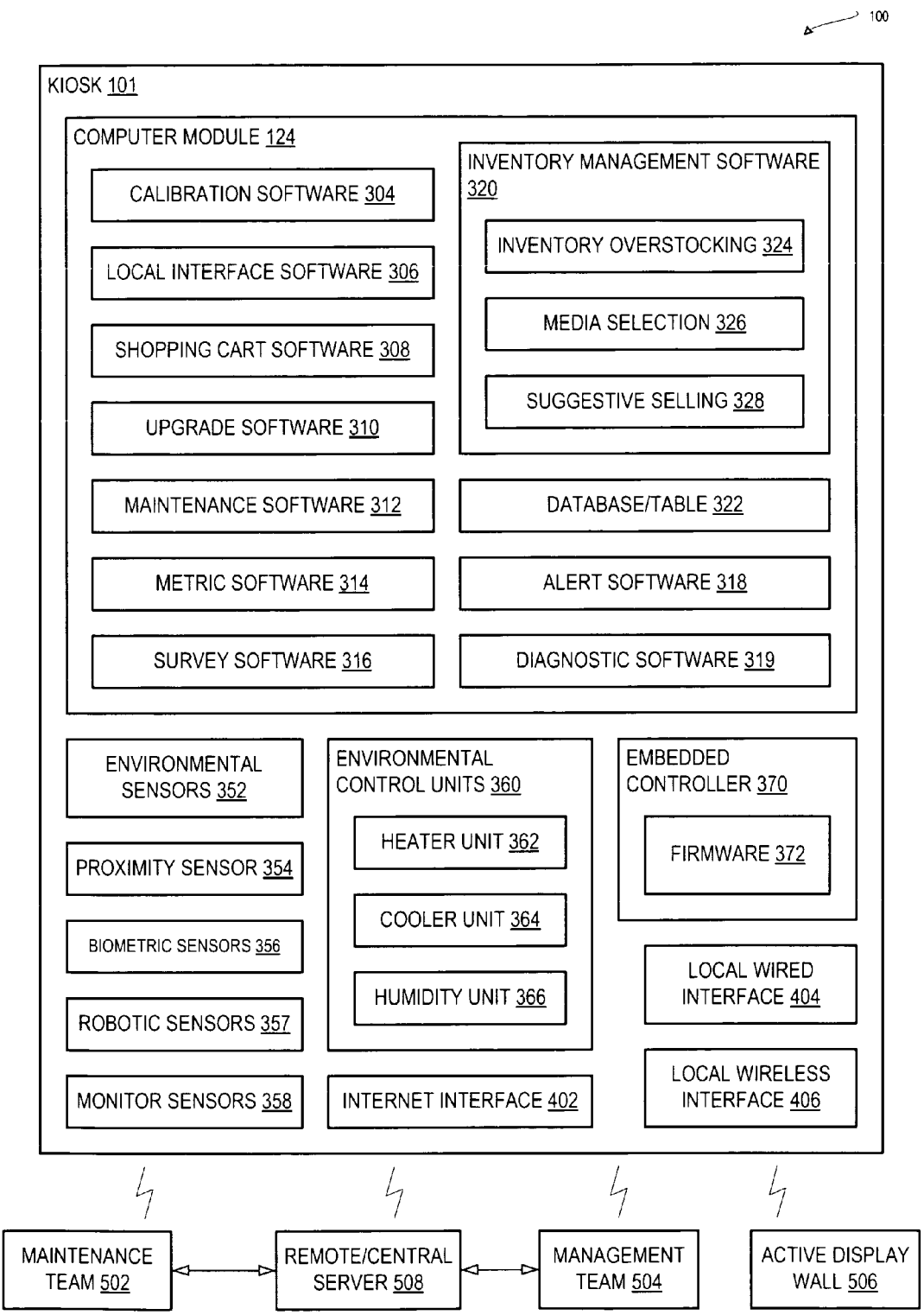
FIG. 13 is a block diagram illustrating exemplary functionality and modularity of the kiosk of FIG. 1A.

FIG. 13 is a block diagram illustrating functionality and modularity of system 100. FIGS. 1A, 1B, 2, 12 and 13 are best viewed together while reading the following description. Computer module 124 is preferably connected to the Internet via an Internet interface 402, so that kiosk 101 may initiate and verify credit card transactions. In one example, kiosk 101 makes a credit transaction via the Internet and then sends a transaction receipt to a customer's email account (thereby avoiding the need to print paper receipts). Should an Internet transaction such as electronic billing fail, an error message similar to those shown in Appendix C may be generated at the customer interface 108. A kiosk communication framework is for example employed in governing e-commerce in accordance with Appendix J.

Kiosk 101 may also include a local wireless interface 406 (e.g., a WiFi Hub) that allows kiosk 101 to serve multiple business functions and provide wireless connectivity to the Internet via Internet interface 402.

Telecommunications device/internet interface 402 also allows functionality of kiosk 101 to be managed or administered from a central administrator remote from the kiosk by a management team 504 or a maintenance team 502, for example employing operations summarized in Appendix D. Maintenance team 502 and management team 504 may be co-located or separate from one another. In an embodiment, calibration software 304 and monitor sensors 358 are accessible from remote maintenance locations by maintenance team 502. In one example of operation, calibration software 304 may be automatically triggered by computer module 124 to perform routine checks on one or more components (e.g., robotic element 122, computer module 124, etc) of kiosk 101. Calibration for example follows steps outlined in the Calibration Tool User Manual, attached as Appendix G.

Results from these calibrations may then be available via Internet interface 402, and/or automatically uploaded to maintenance team 502. Maintenance team 502, therefore, only need visit kiosk 101 when physical maintenance or repair is necessary.

Kiosk 101 may include one or more embedded controllers (e.g., embedded controller 370) that have built-in processing capability and associated firmware (e.g., firmware 372). In one example, embedded controller 370 may reside within robotic element 122 to initiate, control and complete predetermined mechanical operations based upon firmware 372.

In one embodiment, firmware 372 includes program instructions for initiating, controlling and completing mechanical administration of kiosk 101. Embedded controller 370 uses firmware 372 to identify and/or resolve software and/or mechanical problems that may occur within kiosk 101, for example controlling mechanical kiosk components to perform predetermined mechanical functions. If a mechanical problem is detected within kiosk 101, embedded controller 370 may restart one or more embedded controllers, including itself, to attempt to resolve the problem. In another example, if embedded controller 370 controls movement of one or more mechanical elements (e.g., elements within robotic element 114), firmware 372 may also include instructions that move these mechanical elements through one or more sequences designed to repair certain mechanical problems. For example, firmware 372 includes instructions that move the mechanical elements to dislodge interfering objects and/or reposition moveable items. Where recorded media becomes dislodged or out of position, firmware 372 may include instruction to return the recorded media to appropriate inventory position within vertical racks 120.

Embedded controller 370 may further employ firmware instructions to detect and/or diagnose potential error conditions within kiosk 101, using one or more monitor sensors. A plurality of monitor sensors 358 (e.g., cameras, lasers, "stack sensors", contacts, etc.) may be mounted internally and/or externally to kiosk 101 to monitor operation thereof. Controllers 370 for example acquire data from monitor sensors 358 and process the data with algorithms of firmware 372 to determine whether an alarm state exists. Firmware 372 may further provide functionality to report acquired and/or processed data indicative of an alarm state to other embedded controllers and/or to computer module 124.

In one embodiment, diagnostic software 319 within computer module 124 acquires information from monitor sensors 358, and reports this information, as a status of kiosk 101 for example, to management team 504 and/or maintenance team 502 via Internet interface 402. Diagnostic software 319 may also process this information to determine if an 'alarm state' has occurred. Kiosk monitoring for example provides sensors 358 and basic alert support as described in the attached Appendix I.

To increase alignment tolerances of mechanical components during construction of kiosk 101, computer module 124 and embedded controllers (e.g., embedded controller 370) may include calibration software 304 (where included with embedded controllers 370, calibration functions described herein may be stored as firmware 372). A calibration process of calibration software 304 may, for example, determine alignment of robotic element 122 with vertical stacks 120 of horseshoe construct 118 after kiosk 101 is constructed. In particular, embedded controllers within robotic element 122 may interface with one or more robotic sensors 358 to provide location feedback to calibration software 304. Calibration software 304 may, for example, populate a database/table 322 with location/position and tolerance information determined during the calibration process. Once the calibration process is complete, database/table 322 may be utilized during operation of kiosk 101. Further calibration may occur periodically, and/or upon command from management team 204 and/or maintenance team 502. In one example, database/table 322 is updated with calibration information during normal operation of kiosk 101. Calibration information is for example generated at pre-programmed intervals, or in response to external triggers.

System 100 may also include one or more proximity sensors 354 to detect proximity of persons to kiosk 101. For example, proximity sensor 354 mounted on the front of kiosk 101 may detect a person (i.e., a potential customer) approaching kiosk 101. Metric software 314 within computer module 130 may collect proximity information from proximity sensor 354 to build statistical information of a person's behavior around kiosk 101, for example. This statistical information may include one or more of: a time of detection, a length of detection (i.e., how long the person stayed proximate to kiosk 101), distance of the person from kiosk 101, etc. Other statistics may be derived from this information; for example, computer module 130 may also determine ratios between persons proximate to kiosk 101, persons interacting with consumer interface 104 of kiosk 101 and customers completing a transaction with kiosk 101, thereby determining a number of persons passing but not interacting and/or transacting with kiosk 101.

System 100 may also include biometric sensors 356 to identify persons interacting with customer interface 104. In one example, biometric sensors 356 may allow kiosk 101 to determine a person's approximate age by analyzing their facial images. In another example, biometric sensors 356 may allow kiosk 101 to identify individual people utilizing one or more of: facial image recognition, fingerprint recognition, iris recognition, etc.

Kiosk 101 may also include one or more interfaces to allow media to be downloaded into alternative media storage devices. Kiosk 101 may, for example, include hardware to distribute recorded media to an alternate storage device (e.g., by recording data from the recorded media to an alternate format). In another example, kiosk 101 may include a local wired interface 404 (e.g., an Ethernet port or a USB port) to allow an external media storage device to connect to kiosk 101 and receive transmitted media. In another example, kiosk 101 includes a local wireless interface (e.g., Bluetooth, 2.4 GHz wireless 802.11 network, infra-red, optical, etc.) that allows a data storage device, proximate to kiosk 101, to receive transmitted media. In one example, recorded music is transmitted to an MP3 player.

Kiosk 101 may also include hardware to allow recorded media to be delivered to hardware distant from kiosk 101. For example, recorded media may be purchased at kiosk 101 and delivered (e.g., via email) to one or more remote destinations. Computer module 124 may therefore include appropriate software to control and allow transfer of recorded media to one or more other formats, and may also include software to authorize and/or distribute media from a remote location to another remote device.

Figure 14:
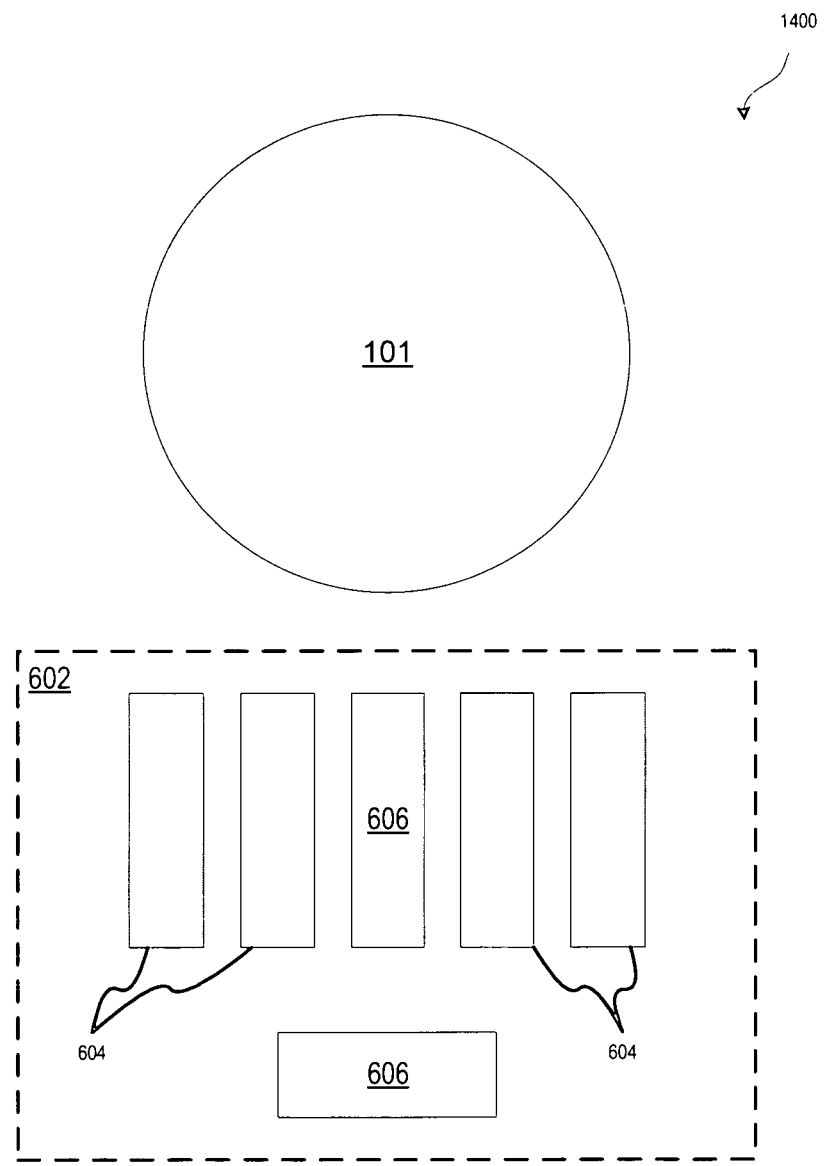
FIG. 14 shows a top schematic view of a system for an automated dispensing and retrieval kiosk for recorded media, with floor mounted graphics that demarcate an area proximate to the kiosk, in accordance with one embodiment.

FIG. 14 shows a system 1400 for an automated dispensing and retrieval kiosk, e.g., kiosk 101, with floor mounted graphics 600 that demarcate an area 602 proximate to kiosk 101. These floor mounted graphics 600 may include active elements 604 for interaction with persons proximate to kiosk 101. For example, active elements 6064 may generate one or more sensory experiences within area 602, such as lighting, odor, sound, humidity, etc.

Returning to FIG. 13, an active display wall 506 may be associated with, or attached to, kiosk 101 to provide additional advertisement display. For example, active display or video wall 506 may represent modular display wing 228(A), FIG. 12, and thus include one or more active display units such as LCDs that display information relating to current inventory of kiosk 101 (e.g., to display trailers for films of inventory within kiosk 101). For example, hardware or software of computer 124 (and/or a remote server 508 in communication with kiosk 101 via telecommunications device/Internet interface 402) includes algorithms for determining the available inventory and advertising one or more recorded media of the available inventory on the display units or on customer interface 108.

Video wall 506 for example receives instructions based upon the recorded media therein, such as instructions to display trailers of new or under-rented media. In another example, active display wall 506 is not necessarily proximate to kiosk 101, but is still controlled by kiosk 101 (e.g., via an Internet or wireless connection).

Kiosk 101 may further include one or more integrated internal environmental control units 360 that allow operation of kiosk 101 within extreme environments. Environmental control units 360 maintain a controlled environment within kiosk 101, for example. If kiosk 101 is utilized in a controlled indoor environment, environmental control units 360 may be superfluous. However, if kiosk 101 is located in an outdoor environment, environmental control units 360 may include one or more modular units such as a heater unit 362, a cooler unit 364 and a humidity unit 366.

Computer module 124 may contain inventory management software 320 for managing inventory of recorded media within kiosk 101, as exemplified in the data and caching framework provided with Appendix A. In one example, inventory management software 320 performs calculations to determine one or more inventory alarm conditions. For example, inventory management software 320 may determine an alarm condition when inventory drops below a certain number. In another example, inventory management software 320 may determine an alarm condition when inventory exceeds a certain level (i.e., when inventory overstocking is in operation). When an alarm condition occurs, an alarm is generated and may be provided to one or more of cell phones, pagers, email addresses, etc., via Internet interface 402. Inventory management software 320 may also include inventory overstocking routines 324, thereby maximizing operation of kiosk 101, for example. Alarms related to inventory, kiosk operational status and other kiosk parameters may be generated and broadcast according to a system monitor service that is for example independent of kiosk system 100 software, in accordance with the architectural overview provided in Appendix F.

Inventory management software 320 may also include media selection routines 326 utilizing algorithms to select a recorded media mix for stocking kiosk 101, based upon historical performance of specific recorded media. Media selection routines 326 may analyze historical information relating to consumer selection of a specific recorded media to predict future selection levels.

Computer module 130 may also include shopping cart software 308 that implements a shopping cart feature for use by customers interacting with customer interface assembly 106. In one example, the shopping card feature operates as a transaction selection aggregation tool.

Computer module 130 may also implement suggestive selling routines 328 (shown within inventory management software 320 for purposes of illustration) that implement a 'rent-me' feature that allows a shortcut to certain recorded media, for example from an initial screen display or a main menu of the customer interface. The 'rent-me' feature may further implement a most direct path to transaction completion for the recorded media. In one example, a customer presses one button to initiate a transaction. The customer may select a title or icon on an initial screen of customer interface 108 to progresses immediately to a payment stage requesting a credit card to be presented.

Suggestive selling routines 328 within inventory management software 320 may, for example, make certain recorded media (e.g., new and/or popular titles) directly available from an initial interaction screen of customer interface 104. Screens other than the initial screen of customer interface 108 may also include buttons that directly initiate transactions. Additionally, system 100 may include program logic for selecting and presenting a particular category from the recorded media to consumers according to predetermined selection criteria, including statistical information such as historical consumer preference of media, available inventory, excess inventory and inventory for sale. The particular category, and/or advertising associated therewith, is for example presented to the consumer on display wings 228, topper 230 or customer interface 108. The statistical information may likewise facilitate determination of media to offer with the rent-me feature.

Computer module 124 may also include remote upgrade software 310, whereby a remote station (e.g., management team 504 and/or maintenance team 502) may send new software to computer module 124. Upgrade software 310 facilitates download, install and execution of the new software without local interaction (i.e., without requiring personnel to attend kiosk 101). In one example, upgrade software 310 allows computer module 124 to periodically (e.g., daily or weekly) interrogate a remote server 508 (e.g., accessible by maintenance team 502) to download new software, if available. Thus, computer module 124 is automatically updated without external initiation. Upgrades may be automatically verified, for example by implementing the testing plan outlined in Appendix E.

Computer module 124 may also include maintenance software 312 that allows maintenance of kiosk 101 to be performed from a remote location. For example, maintenance team 502 may interrogate maintenance software 312 to determine one or more internal temperatures and other internal environmental parameters of kiosk 101. Kiosk 101 may, for example, include one or more internal environmental sensors 352 that interface to maintenance software 312. Maintenance software 312 may also determine when critical maintenance of kiosk 101 is necessary, and may automatically request this maintenance of maintenance team 502, and/or perform critical maintenance, where possible. In another example, algorithms within maintenance software 312 may predict and request preventative maintenance, thereby preventing failure of kiosk 101. Such maintenance is not limited to physical maintenance of mechanisms within kiosk 101, but may also include maintenance of data and software of kiosk 101.

Computer module 124 may also include metric software 314 that monitors transactions of recorded media to determine certain metrics and may export these metrics to other servers. Metric software 314 may, for example, deliver point of sale demographic data, derived from these metrics, to other servers that may monitor more than one kiosk. In another example, metric software 314 delivers demographic data to rating servers.

Computer module 124 may also include survey software 316 invoked to run a survey acquisition funded from external sources (i.e., a survey paid for by an external entity). In one example, a survey may specifically target customers that complete transactions for one or more specific recorded media. Upon request for or completion of a transaction for a predetermined recorded media, computer 124 may run software 316 to present a survey at customer interface 108, for example posing a series of consumer queries chosen from the poll questions presented in Appendix B, to gain metric data. The gained data may be used to update the statistical information utilized in connection with the rent-me and advertising capabilities described herein.

Inventory management software 320 may also include a suggestive selling algorithm 328 that actively promotes marketing of remaining inventory items, thereby improving inventory turnover of kiosk 101. In one example, suggestive selling algorithm 328 may modify one or more marketing displays of kiosk 101 to advertise remaining inventory items.

If a customer inputs an email address in order to receive a transaction receipt, this email address may be stored within kiosk 101 and/or sent to remote server 508 that is for example accessible by management team 504, for marketing purposes. Further, a customer may be given an opportunity to input a second email address (e.g., an email address of a friend) to receive invitations based upon the customer's transaction. In one example, a customer may input one or more friends' email addresses to receive advertisements for a certain recorded media; these email addresses may also be stored and used for marketing purposes. In one example, emails containing advertisements, which may be selected according to the aforementioned statistical information, may be periodically generated and sent by kiosk 101. In another example, kiosk 101 may allow a person interacting with customer interface 108 to send an advertisement to an email address. For example, if a person, interacting with consumer interface 108, touches an advertisement on the screen, kiosk 101 may request an email address from the person and then send a copy of the advertisement to the email address. This email address may also be stored for marketing purposes. Further, kiosk 101 may include promotional codes within these emails that allow the recipient to receive one or more transactional discounts.

Kiosk 101 may also be utilized for public service announcements. Computer module 124 may include alert software 318 that allows kiosk 101 to periodically connect to one or more government agency databases (e.g., via the Internet) to download one or more public service announcements or alerts. For example, kiosk 101, utilizing alert software 318 and Internet interface 402, may automatically, or upon command from a remote server such as server 508, connect to a government server and download one or more amber alerts and/or terror alerts. These alerts may then be displayed on one or more advertisement/marketing displays (e.g., modular display topper 230, display wings 228A, 228B and/or customer interface 108) of kiosk 101. In another example of operation, these alerts may be sent to kiosk 101 manually (e.g., via management team 504) for display on one or more marketing displays of kiosk 101.

Where kiosk 101 operates for recorded media rental (i.e., allowing a customer to rent one or more recorded media from an inventory of recorded media stored within kiosk 101), inventory management software 320 may provide for converting a recorded media item from rentable to saleable. For example, one or more software algorithms monitor rental frequency of recorded media and thereby make decisions, based on predetermined limits, thresholds and other information, to convert one or more inventory items from rental items to sale items. For example, if kiosk 101 has twenty recorded media of one film, as this film becomes less popular the frequency of rental of associated recorded media reduces. Algorithms of inventory management software 320 may then determine that ten of the twenty recorded media containing this film may be sold, for example. As the frequency of rental for the remaining ten recorded media reduces further, algorithms of inventory management software 320 may determine that stock of associated recorded media should be reduced further. As items of inventory are sold, kiosk 101 may inform management team 504 that space is available within kiosk 101 for new recorded media, for example.

The exemplary source code of Appendix C, in compiled form, may be used to provide program instructions configuring system 100/200 for operations as described herein, where the program instructions may reside on circuitry, for example as shown in the case of computer 124 and embedded controller 370 (for purposes of illustration, Appendix C may be viewed with Appendix H, which provides exemplary case studies of code migration). Unless otherwise noted, it will be appreciated that what is shown is a non-limiting embodiment and the circuitry may be more broadly provided on any electronically programmable system, such as a computer having a single processor, multiple processors or in a distributed processing environment. Likewise, data storage may be local to the kiosk, adjunct to a server, or in a distributed or shared databasing environment.

Changes may be made in the above systems without departing from the scope hereof. As apparent from reading and fully understanding this specification, kiosks 101, 201 are modular in both functionality and serviceability. These modules may include software and hardware. In particular, these modules are field selectable, replaceable and maintainable, for example facilitating configuration of kiosks 101, 201 to provide functionality as desired for various levels of business and maintenance. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A kiosk for dispensing and retrieving recorded media employing a robotic element, the kiosk comprising:
    a telecommunications system for exchanging data between a central administrator and the kiosk, the kiosk having electronic controls responsive to instructions from the central administrator for governing administration of the kiosk according to a first state and a second state;
    wherein the first state provides for automatic administration of the kiosk, the first state comprising first program instructions for one or more of:
        selecting a mix of recorded media for the kiosk inventory,
        converting a recorded media from rentable to saleable,
        performing software upgrades from one or more remote locations,
        performing analysis of the kiosk,
        predicting maintenance of the kiosk,
        determining an alarm condition,
        generating an alarm in response to the alarm condition, and
        performing maintenance of the kiosk; and
    wherein the second state provides for remote administration of the kiosk via the telecommunications system according to the instructions from the central administrator, the second state comprising second program instructions initialized at a remote server of the central administrator for maintenance of the kiosk, wherein the second program instructions include program instructions for:
        performing a routine to check on performance of the robotic element,
        selecting a mix of recorded media for the kiosk inventory,
        converting a recorded media from rentable to saleable,
        performing software upgrades from one or more remote locations,
        performing remote analysis of the kiosk,
        predicting maintenance of the kiosk,
        determining an alarm condition,
        generating an alarm in response to the alarm condition,
        updating a protocol regularly, wherein the kiosk reports kiosk operating conditions to the central administrator via the telecommunications system, and
        performing remote maintenance of the kiosk.

2. The kiosk of claim 1 wherein the first and/or second program instructions comprise software.

3. The kiosk of claim 2 wherein the software is operable at one or both of a local computer within the kiosk and a remote server associated with the central administrator.

4. The kiosk of claim 3 wherein the software for selecting a mix of recorded media comprises algorithms for determining the mix based upon historical performance of specific recorded media.

5. The kiosk of claim 4 wherein the software for determining an alarm condition comprises inventory management software having algorithms for determining an alarm condition based upon inventory of recorded media within the kiosk.

6. The kiosk of claim 1 further comprising controllers embedded within the kiosk, wherein—
    the controllers include firmware, and the first and/or second program instructions are contained in the firmware; and
    the controllers are configured to control one or more mechanical components within the kiosk.

7. The kiosk of claim 1 wherein the first and/or second program instructions include program instructions for automatically calibrating the kiosk utilizing one or more sensors for providing calibration information for one or more systems within the kiosk.

8. The kiosk of claim 1 wherein the second program instructions comprise software.

9. The kiosk of claim 1 wherein the second program instructions are configured to generate an alarm comprises initializing software for broadcasting the alarm condition to one or more of cell phones, pagers and email recipients.

10. The kiosk of claim 1, further comprising an internal environmental control unit for maintaining an environment within the kiosk, wherein the internal environmental control unit is operable with the first state or the second state.

11. The kiosk of claim 1, further comprising an interface operable with the telecommunications system for communication between the kiosk and one or both of a remote server associated with the central administrator and a second kiosk.

12. The kiosk of claim 11, further comprising hardware to distribute inventories of recorded media between the kiosk and one or both of the remote server and the second kiosk, via the interface.

13. The kiosk of claim 1 wherein the kiosk is one of a group of kiosks and further comprises an interface between the kiosk and other kiosks in the group, and wherein the telecommunications system is configured to exchange data between the kiosk and the other kiosks in the group via the interface, and wherein the kiosk communicates directly with the other kiosks in the group to locate stock of recorded media.

14. The kiosk of claim 13 wherein the kiosk is configured to identify one or more other kiosks of the group that have stock of a particular recorded media.

15. The kiosk of claim 14 wherein the kiosk is configured to reserve stock of the particular recorded media within the one or more other kiosks of the group for a potential customer.

16. The kiosk of claim 1, further comprising hardware and software for delivering inventories of recorded media via the interface to the remote server associated with the central administrator.

17. The kiosk of claim 1 wherein the robotic element includes an embedded controller resident therein, and wherein the kiosk is configured to initiate, control and complete predetermined mechanical operations of the robotic element in the second state utilizing the embedded controller.

18. The kiosk of claim 17 wherein the embedded controller is configured to detect and diagnose potential error conditions using one or more monitor sensors.

* * * * *

UNITED STATES PATENT AND TRADEMARK OFFICE
CERTIFICATE OF CORRECTION

PATENT NO. : 9,224,137 B1
APPLICATION NO. : 11/366966
DATED : December 29, 2015
INVENTOR(S) : Philip Tomasi et al.

It is certified that error appears in the above-identified patent and that said Letters Patent is hereby corrected as shown below:

Title Page, item (56)

On page 3, in column 2, under "Other Publications", line 27, delete "52 pages." and insert -- 53 pages. --, therefor.

In the Specification

In column 3, line 34, delete "fftkioskbaiscstranslation.sql" and insert -- fftkioskbasicstranslation.sql --, therefor.

In column 4, line 6, delete "ffttexttransalation.sql" and insert -- ffttexttranslation.sql --, therefor.

In column 4, line 17, delete "tr_fftforniattranslation_u.sql" and insert -- tr_fftformattranslation_u.sql --, therefor.

In column 4, line 22, delete "tr_ffigroupcode_u.sql" and insert -- tr_fftgroupcode_u.sql --, therefor.

In column 4, line 30, delete "tr_ffilocale_u.sql" and insert -- tr_fftlocale_u.sql --, therefor.

In column 4, line 41, delete "tr_fftpriceoptionu.sql" and insert -- tr_fftpriceoption_u.sql --, therefor.

In column 4, line 48, delete "tr_fftratingsystemu.sql" and insert -- tr_fftratingsystem_u.sql --, therefor.

In column 4, line 58, delete "tr_ffititletypetranslation_u.sql" and insert -- tr_ffttitletypetranslation_u.sql --, therefor.

In column 6, line 33, delete "companygroupdetailsjsp" and insert -- companygroupdetails.jsp --, therefor.

In column 6, line 35, delete "companygroupqueryjsp" and insert -- companygroupquery.jsp --, therefor.

In column 6, line 37, delete "customerhistoryjsp" and insert -- customerhistory.jsp --, therefor.

In column 6, line 40, delete "dataexportjsp" and insert -- dataexport.jsp --, therefor.

In column 6, line 41, delete "discdetailsjsp" and insert -- discdetails.jsp --, therefor.

In column 6, line 48, delete "kiosklistjsp" and insert -- kiosklist.jsp --, therefor.

Signed and Sealed this
Nineteenth Day of July, 2016

Michelle K. Lee
*Director of the United States Patent and Trademark Office*

In column 6, line 53, delete "latefeenotifyjsp" and insert -- latefeenotify.jsp --, therefor.

In column 6, line 55, delete "lookuptablesmenujsp" and insert -- lookuptablesmenu.jsp --, therefor.

In column 6, line 56, delete "marketingcommercialdeploymentjsp" and insert -- marketingcommercialdeployment.jsp --, therefor.

In column 6, line 57, delete "marketingcorporatetoolsjsp" and insert -- marketingcorporatetools.jsp --, therefor.

In column 6, line 58, delete "marketingfranchisereportingjsp" and insert -- marketingfranchisereporting.jsp --, therefor.

In column 7, line 3, delete "rentalreceiptjsp" and insert -- rentalreceipt.jsp --, therefor.

In column 7, line 4, delete "reportsjsp" and insert -- reports.jsp --, therefor.

In column 7, line 5, delete "reportsqueryjsp" and insert -- reportsquery.jsp --, therefor.

In column 7, line 6, delete "reportsreusablecodejsp" and insert -- reportsreusablecode.jsp --, therefor.

In column 7, line 8, delete "sitetypelookupjsp" and insert -- sitetypelookup.jsp --, therefor.

In column 7, line 9, delete "titledetailsjsp" and insert -- titledetails.jsp --, therefor.

In column 7, line 10, delete "titlehstjsp" and insert -- titlehst.jsp --, therefor.

In column 7, line 12, delete "titletypelookupjsp" and insert -- titletypelookup.jsp --, therefor.

In column 7, line 14, delete "transactiondetailsjsp" and insert -- transactiondetails.jsp --, therefor.

In column 7, line 15, delete "transactionlistjsp" and insert -- transactionlist.jsp --, therefor.

In column 7, line 16, delete "transactionqueryjsp" and insert -- transactionquery.jsp --, therefor.

In column 7, line 43, delete "fight.'ava" and insert -- light.java --, therefor.

In column 8, line 48, delete "exceptioncodes.iava" and insert -- exceptioncodes.java --, therefor.

In column 9, line 19, delete "cmdaettitletypenamelookup.java" and insert -- cmdgettitletypenamelookup.java --, therefor.

In column 10, line 6, delete "paymentprocesson.java" and insert -- paymentprocessor.java --, therefor.

In column 10, line 43, delete "getplcrecordrequest.java" and insert -- getpkrecordrequest.java --, therefor.

In column 14, line 26, delete "kiosk" and insert -- kiosk. --, therefor.

In column 14, line 46, delete "FIG. 3" and insert -- FIG. 3. --, therefor.

In column 14, line 48, delete "FIG. 3" and insert -- FIG. 3. --, therefor.

In column 14, line 65, delete "construct" and insert -- construct. --, therefor.

In column 15, line 56, delete "kiosk" and insert -- kiosk. --, therefor.

In column 18, line 38, delete "forei gn.jpg" and insert -- foreign.jpg --, therefor.

In column 18, line 43, delete "homejpg" and insert -- home.jpg --, therefor.

In column 18, line 65, delete "OpsUnableVeri fyPaymentCard.jpg" and insert

CERTIFICATE OF CORRECTION (continued)
U.S. Pat. No. 9,224,137 B1

In column 19, line 22, delete "S3 jpg" and insert -- S3.jpg --, therefor.

In column 19, line 34, delete "Tool_CardReaderH1D.jpg" and insert --Tool_CardReaderHID.jpg --, therefor.

In column 20, line 62, delete "face)" and insert -- interface) --, therefor.

In column 26, line 66, delete "2288" and insert -- 228B --, therefor.